(12) United States Patent
Plotnikov et al.

(10) Patent No.: US 11,436,010 B2
(45) Date of Patent: Sep. 6, 2022

(54) METHOD AND APPARATUS FOR VECTORIZING INDIRECT UPDATE LOOPS

(71) Applicant: Intel Corporation, Santa Clara, CA (US)

(72) Inventors: Mikhail Plotnikov, Nizhny Novgorod (RU); Christopher J. Hughes, Santa Clara, CA (US); Andrey Naraikin, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/616,379

(22) PCT Filed: Jun. 30, 2017

(86) PCT No.: PCT/US2017/040508
§ 371 (c)(1),
(2) Date: Nov. 22, 2019

(87) PCT Pub. No.: WO2019/005165
PCT Pub. Date: Jan. 3, 2019

(65) Prior Publication Data
US 2021/0294605 A1 Sep. 23, 2021

(51) Int. Cl.
*G06F 9/30* (2018.01)
(52) U.S. Cl.
CPC ...... *G06F 9/30036* (2013.01); *G06F 9/30021* (2013.01); *G06F 9/30145* (2013.01)
(58) Field of Classification Search
CPC ............. G06F 9/30036; G06F 9/30021; G06F 9/30145
See application file for complete search history.

(56) References Cited

U.S. PATENT DOCUMENTS

| 5,815,723 A | 9/1998 | Wilkinson et al. |
| 5,845,112 A | 12/1998 | Nguyen et al. |

(Continued)

FOREIGN PATENT DOCUMENTS

| CN | 103959237 A | 7/2014 |
| CN | 104025022 A | 9/2014 |

(Continued)

OTHER PUBLICATIONS

International Search Report and Written Opinion for Application No. PCT/US2017/040508, dated Mar. 9, 2018, 13 pages.

(Continued)

*Primary Examiner* — Zachary K Huson
(74) *Attorney, Agent, or Firm* — Nicholson De Vos Webster & Elliott LLP

(57) ABSTRACT

Disclosed embodiments relate to a new instruction for detecting conflicts in a set of vector elements. In one example, a system includes circuits to fetch, decode, and execute an instruction that includes an opcode, a destination vector identifier, and a source vector identifier, wherein the execution circuit is to, for each data element position of a source vector identified by the source vector identifier, determine a nearest matching data element position in the source vector storing a same data value as stored at the data element position, the nearest matching data element position located between the data element position and a least significant data element position of the source vector, and store, in a corresponding data element position of a destination vector identified by the destination vector identifier, a value identifying the determined nearest data element position.

15 Claims, 22 Drawing Sheets

(56) References Cited

U.S. PATENT DOCUMENTS

| | | | |
|---|---|---|---|
| 5,964,861 A | 10/1999 | Gabzdyl et al. | |
| 6,199,089 B1 | 3/2001 | Mansingh | |
| 6,205,461 B1 | 3/2001 | Mansingh | |
| 6,798,833 B2 | 9/2004 | Lee et al. | |
| 6,901,396 B1 | 5/2005 | Taylor | |
| 6,909,744 B2 | 6/2005 | Molloy | |
| 7,149,764 B2 | 12/2006 | Henry et al. | |
| 7,506,135 B1 | 3/2009 | Mimar | |
| 7,539,717 B2 | 5/2009 | Hussain | |
| 7,693,086 B2 | 4/2010 | Honda | |
| 7,818,358 B2 | 10/2010 | Henry et al. | |
| 7,849,292 B1 | 12/2010 | Ashcraft et al. | |
| 7,991,987 B2 | 8/2011 | Cabot | |
| 8,205,066 B2 | 6/2012 | Brewer et al. | |
| 8,447,962 B2 | 5/2013 | Hughes et al. | |
| 9,280,342 B2 | 3/2016 | Gove | |
| 9,372,692 B2 | 6/2016 | Hughes et al. | |
| 9,411,584 B2 | 8/2016 | Hughes et al. | |
| 9,411,592 B2 | 8/2016 | Valentine et al. | |
| 9,448,794 B2 | 9/2016 | Ould-Ahmed-Vall et al. | |
| 9,513,905 B2 | 12/2016 | Smelyanskiy et al. | |
| 9,575,757 B2 | 2/2017 | Ould-Ahmed-Vall et al. | |
| 9,851,970 B2 | 12/2017 | Kunzman et al. | |
| 10,514,923 B2 | 12/2019 | Madduri et al. | |
| 2003/0135722 A1 | 7/2003 | Johnson | |
| 2005/0125631 A1 | 6/2005 | Symes et al. | |
| 2009/0100247 A1 | 4/2009 | Moyer et al. | |
| 2009/0112955 A1 | 4/2009 | Kershaw et al. | |
| 2009/0249026 A1 | 10/2009 | Smelyanskiy et al. | |
| 2009/0276606 A1 | 11/2009 | Mimar | |
| 2011/0302394 A1 | 12/2011 | Russell et al. | |
| 2012/0078992 A1 | 3/2012 | Wiedemeier et al. | |
| 2012/0079253 A1 | 3/2012 | Wiedemeier et al. | |
| 2012/0159130 A1 | 6/2012 | Smelyanskiy et al. | |
| 2012/0166761 A1 | 6/2012 | Hughes et al. | |
| 2013/0044819 A1 | 2/2013 | Uppalapati et al. | |
| 2013/0086328 A1 | 4/2013 | Frank et al. | |
| 2013/0311530 A1 | 11/2013 | Lee et al. | |
| 2014/0089634 A1 | 3/2014 | Lee et al. | |
| 2014/0095828 A1 | 4/2014 | Plotnikov et al. | |
| 2014/0095842 A1 | 4/2014 | Caprioli et al. | |
| 2014/0108480 A1 | 4/2014 | Ould-Ahmed-Vall et al. | |
| 2014/0189288 A1 | 7/2014 | Hartono et al. | |
| 2014/0189294 A1 | 7/2014 | Walsh et al. | |
| 2014/0189307 A1 | 7/2014 | Valentine et al. | |
| 2014/0189308 A1 | 7/2014 | Hughes et al. | |
| 2014/0189320 A1 | 7/2014 | Kuo | |
| 2014/0281401 A1 | 9/2014 | Hughes et al. | |
| 2014/0317377 A1* | 10/2014 | Ould-Ahmed-Vall | G06F 9/3016 712/4 |
| 2015/0278268 A1* | 10/2015 | El-Ali | G06F 16/245 707/722 |
| 2016/0092218 A1* | 3/2016 | Gonion | G06F 9/30036 712/7 |
| 2016/0179537 A1 | 6/2016 | Kunzman et al. | |
| 2016/0378716 A1 | 12/2016 | Grochowski et al. | |
| 2018/0018173 A1 | 1/2018 | Hayes et al. | |

FOREIGN PATENT DOCUMENTS

| | | | |
|---|---|---|---|
| CN | 104204989 A | 12/2014 | |
| JP | 2005-174292 A | 6/2005 | |
| JP | 2014-505916 A | 3/2014 | |
| WO | 2013/100989 A1 | 7/2013 | |
| WO | 2014/051733 A2 | 4/2014 | |
| WO | 20161244242 A1 | 8/2016 | |

OTHER PUBLICATIONS

Decision to Grant a Patent, JP App. No. 2017-527586, dated Mar. 31, 2020, 3 pages (2 pages of Partial English Translation and 1 page of Original Document).

Final Office Action, U.S. Appl. No. 16/616,385, dated Apr. 16, 2021, 37 pages.

First Office Action, CN App. No. 201580063820.8, dated Mar. 30, 2020, 17 pages (10 pages of English Translation and 7 pages of Original Document).

Intel Advanced Vector Extensions Programming Reference, Jun. 2011, 595 pages.

Intel, "Intel® 64 and IA-32 Architectures Software Developer's Manual", Combined vols. 1, 2A, 2B, 2C, 3A, 3B and 3C, Order No. 325462-052US, Sep. 2014, 3439 pages.

International Preliminary Report on Patentability, PCT App. No. PCT/US2015/062074, dated Jul. 6, 2017, 6 pages.

International Preliminary Report on Patentability, PCT App. No. PCT/US2017/040509, dated Jan. 9, 2020, 7 pages.

International Search Report and Written Opinion for Application No. PCT/US2017/040509, dated Feb. 20, 2018, 8 pages.

International Search Report and Written Opinion, PCT App. No. PCT/US2015/062074, dated Apr. 22, 2016, 7 pages.

Kumar S., et al., "Atomic Vector Operations on Chip Multiprocessors," Proceedings of the 35th Annual International Symposium on Computer Architecture, Jun. 2008, pp. 441-452.

Non-Final Office Action from U.S. Appl. No. 13/731,008, dated Oct. 15, 2015, 7 pages.

Non-Final Office Action from U.S. Appl. No. 15/188,817, dated Oct. 25, 2016, 7 pages.

Non-Final Office Action from U.S. Appl. No. 15/912,468, dated Jun. 15, 2018, 6 pages.

Non-Final Office Action from U.S. Appl. No. 15/912,486, dated Jun. 15, 2018, 6 pages.

Non-Final Office Action from U.S. Appl. No. 15/912,498, dated Jun. 15, 2018, 6 pages.

Non-Final Office Action, U.S. Appl. No. 16/616,385, dated Jan. 6, 2021, 35 pages.

Non-Final Office Action, U.S. Appl. No. 16/616,385, dated Sep. 20, 2021, 35 pages.

Notice of Reasons for Refusal, JP App. No. 2017-527586, dated Nov. 12, 2019, 5 pages (3 pages of English Translation and 2 pages of Original Document).

Notification to Grant Patent Right for Invention, CN App. No. 201580063820.8, dated Dec. 24, 2020, 5 pages (3 pages of English Translation and 2 pages of Original Document).

Office Action, EP App. No. 15873971.4, dated Mar. 2, 2021, 05 pages.

Second Office Action, CN App. No. 201580063820.8, dated Sep. 29, 2020, 8 pages (5 pages of English Translation and 3 pages of Original Document).

ST, RM0004 Reference Manual—Programmer's reference manual for Book E processors, DocID13694 Rev 2, May 2015, pp. 1/1025 and 417/1025 (Year: 2015).

Taiwan Office Action and Search Report for foreign counterpart Taiwan Application No. 105142765, dated Aug. 11, 2017, 12 pages.

Notification of Reason for Refusal, KR App. No 10-2017-7013503, dated Dec. 28, 2021, 8 pages (4 pages of English Translation and 4 pages of Original Document).

* cited by examiner

FIG. 1

Source vector 101

| Offset | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| vindex1 | 5 | 5 | 3 | 5 | 9 | 3 | 3 | 3 | 9 | 9 | 5 | 5 | 9 | 5 | 9 | 9 | vconf1 = VPCONFLICT(vindex1)

Destination vector 102

|    | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 0  | 0 | 0 | 0 | 0 | 1 | 0 | 0 | 0 | 1 | 1 | 0 | 0 | 1 | 0 | 1 | 0 |
| 1  | 0 | 0 | 0 | 0 | 1 | 0 | 0 | 0 | 1 | 1 | 0 | 0 | 1 | 0 | 0 | 0 |
| 2  | 1 | 1 | 0 | 1 | 0 | 0 | 0 | 0 | 0 | 0 | 1 | 1 | 0 | 0 | 0 | 0 |
| 3  | 0 | 0 | 0 | 0 | 1 | 0 | 0 | 0 | 1 | 1 | 0 | 0 | 0 | 0 | 0 | 0 |
| 4  | 1 | 1 | 0 | 1 | 0 | 0 | 0 | 0 | 0 | 0 | 1 | 0 | 0 | 0 | 0 | 0 |
| 5  | 1 | 1 | 0 | 1 | 0 | 0 | 0 | 0 | 0 | 0 | 0 | 0 | 0 | 0 | 0 | 0 |
| 6  | 0 | 0 | 0 | 0 | 1 | 0 | 0 | 0 | 1 | 0 | 0 | 0 | 0 | 0 | 0 | 0 |
| 7  | 0 | 0 | 0 | 0 | 1 | 0 | 0 | 0 | 0 | 0 | 0 | 0 | 0 | 0 | 0 | 0 |
| 8  | 0 | 0 | 1 | 0 | 0 | 1 | 1 | 0 | 0 | 0 | 0 | 0 | 0 | 0 | 0 | 0 |
| 9  | 0 | 0 | 1 | 0 | 0 | 1 | 0 | 0 | 0 | 0 | 0 | 0 | 0 | 0 | 0 | 0 |
| 10 | 0 | 0 | 1 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 |
| 12 | 1 | 1 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 |
| 14 | 1 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 |
| ... 32 | 0 | 0 | 0 | 0 | 0 | 0 | 0 | 0 | 0 | 0 | 0 | 0 | 0 | 0 | 0 | 0 |

```
Pseudocode for nearest right conflict instruction:

VCONF_NRC dest, src for(i=0; i<KL; i++){
    dest[i] = -1;
    for(k=i-1; k>=0; k--){
        if(src[k]==src[i]){
            dest[i] = k;
            break;
        }
    }
}
```

FIG. 5B
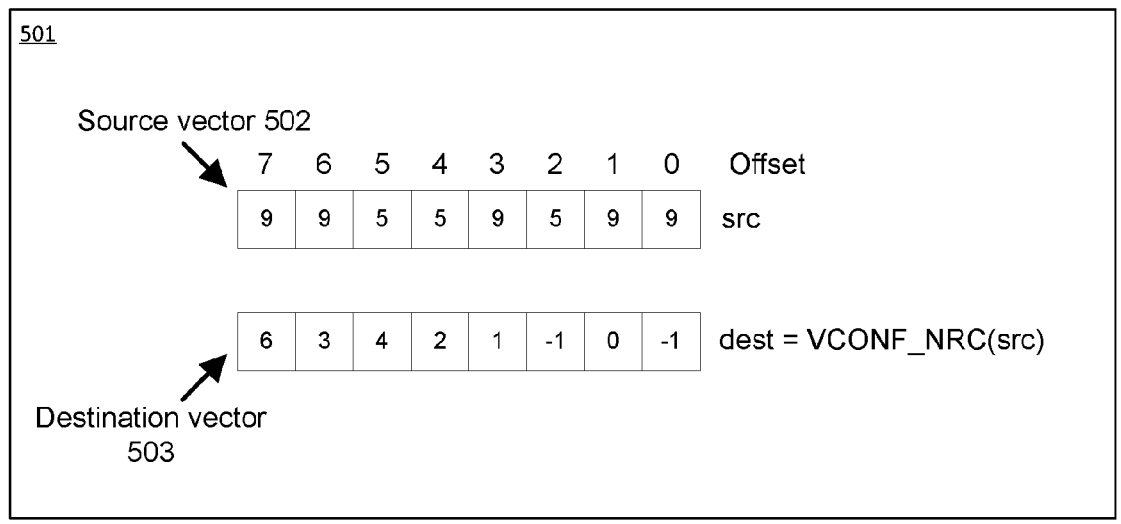
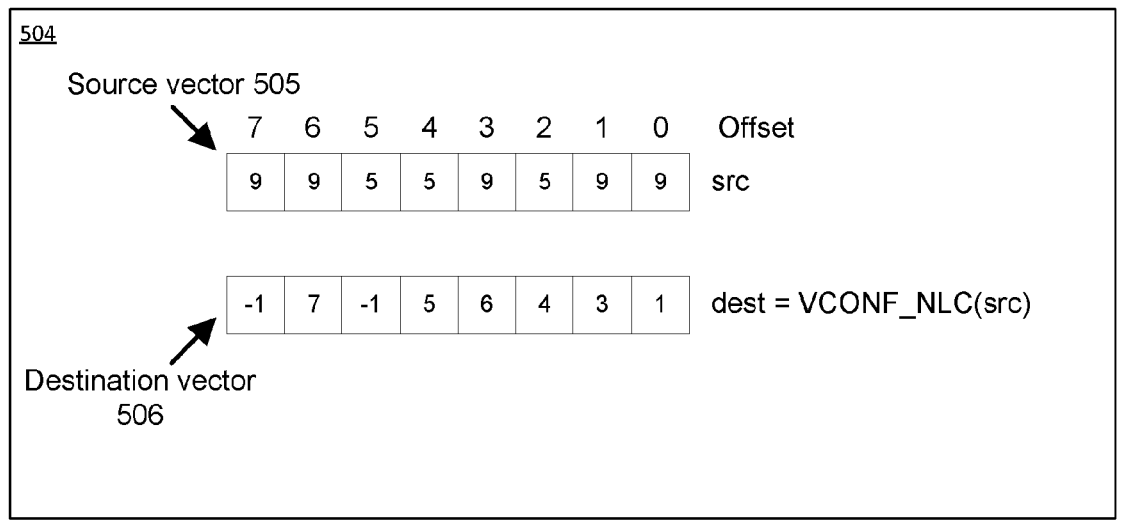
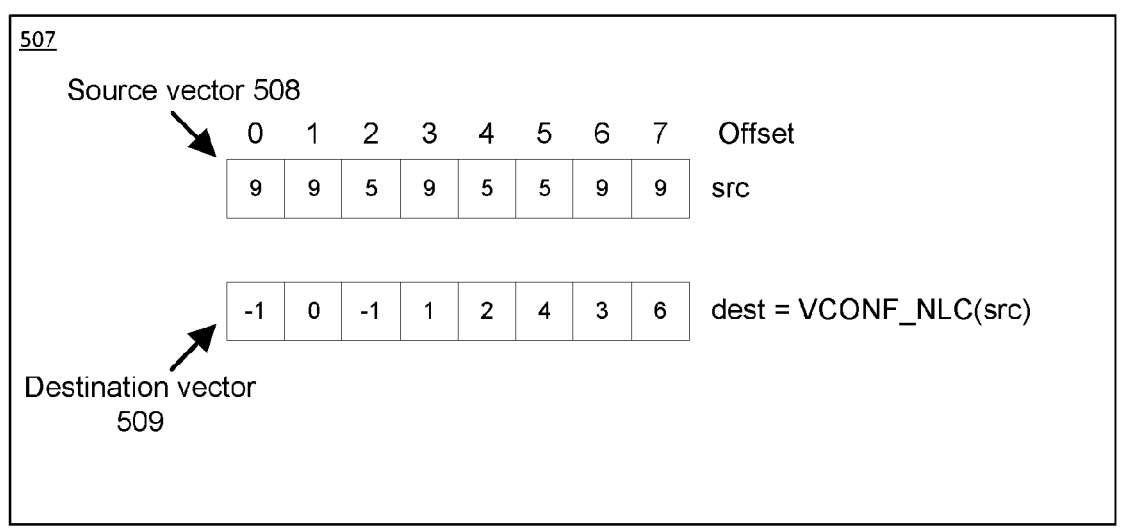

FIG. 7A

701 

```
Pseudocode for implementing a double permute tree algorithm:

for(i=0; i<N; i+=KL){
      vindex1 = VLOAD(index+i);
      vres = VLOAD(B+i);
      v1 = VGATHER(vindex1, Out);
      vperm_control = VCONF_NRC(vindex1);
      mask_todo = VCMPNEQ(vperm_control, vall_minus_ones);
      if(mask_todo!=0){
              do{
                      vtmp {mask_todo} = VPERM(vperm_control, vres);
                      vres {mask_todo} = VADD(vtmp, vres);
                      vperm_control {mask_todo} = VPERM(vperm_control, vperm_control);
                      mask_todo = VCMPNEQ(vperm_control, vall_minus_ones);
              } while(mask_todo != 0);
      }
      vres = VADD(v1, vres);
      VSCATTER(Out, vindex1, vres);
}
```

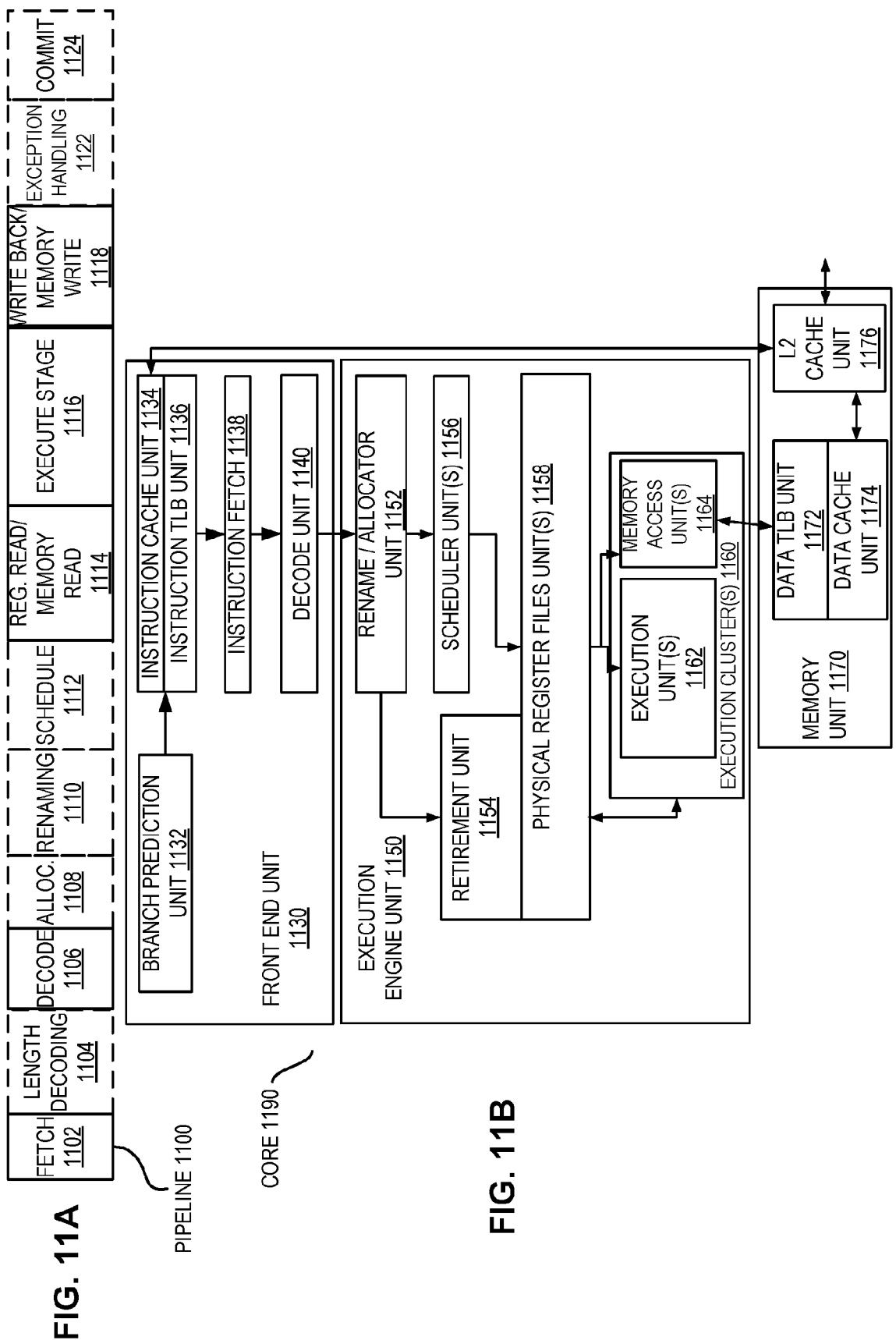

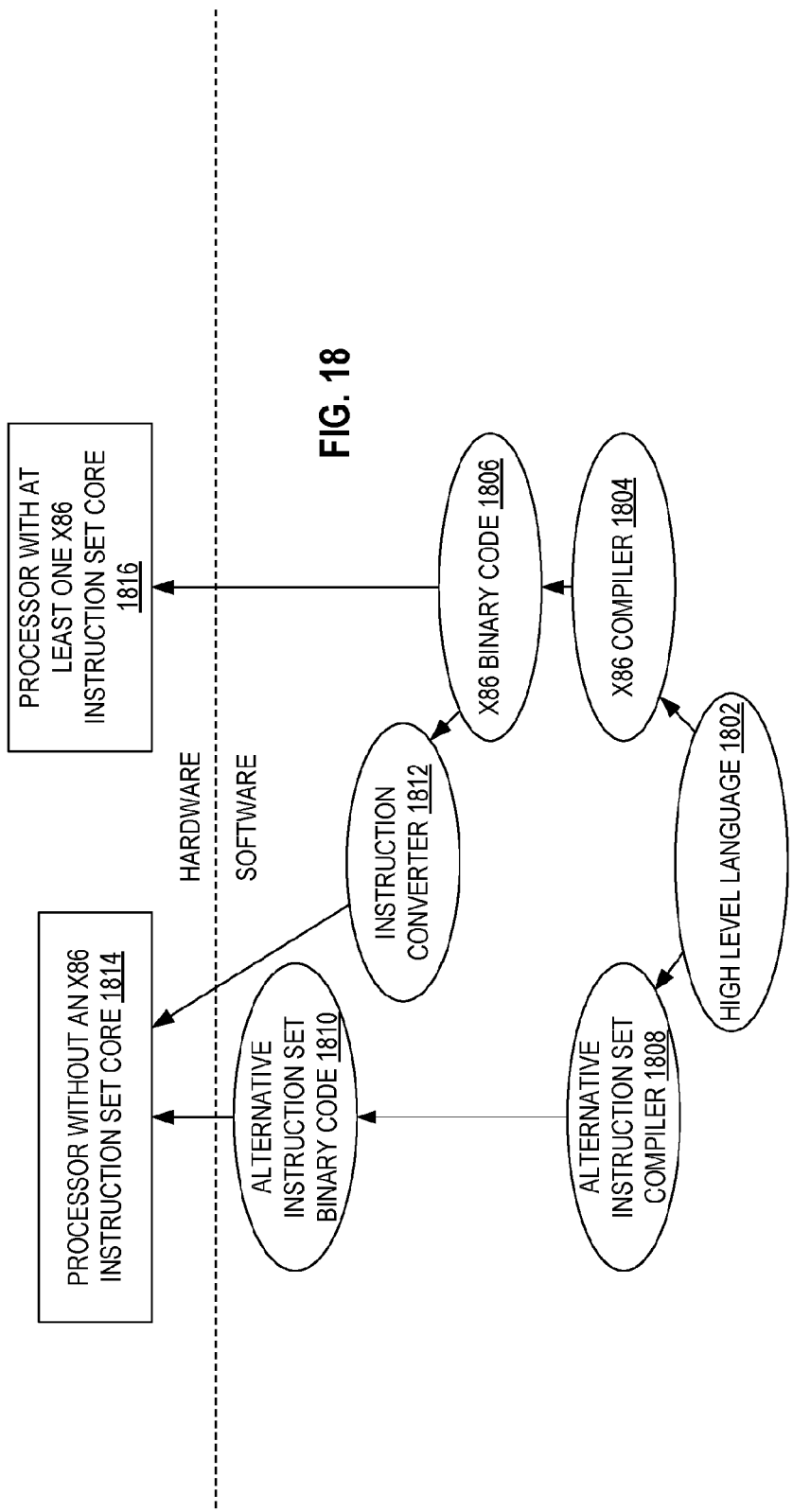

METHOD AND APPARATUS FOR VECTORIZING INDIRECT UPDATE LOOPS

CROSS-REFERENCE TO RELATED APPLICATIONS

This application is a national stage of International Application No. PCT/US2017/040508, filed Jun. 30, 2017.

FIELD OF INVENTION

The field of invention relates generally to computer processor architecture. More specifically, the field of the invention relates to conflict detection for a set of vector elements and to performing reduction operations on a set of vector elements.

BACKGROUND

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. A given instruction is expressed using a given instruction format (and, if defined, in a given one of the instruction templates of that instruction format) and specifies the operation and the operands. An instruction stream is a specific sequence of instructions, where each instruction in the sequence is an occurrence of an instruction in an instruction format (and, if defined, a given one of the instruction templates of that instruction format).

BRIEF DESCRIPTION OF THE DRAWINGS

The present invention is illustrated byway of example and not limitation in the figures of the accompanying drawings, in which like references indicate similar elements and in which:

FIG. 1 illustrates an exemplary execution of a conflict detection instruction, according to some embodiments;

FIG. 5A is pseudocode illustrating execution of a nearest right conflict instruction, according to an embodiment;

FIG. 5B includes diagrams illustrating execution of a nearest right (or left) conflict instructions, according to some embodiments;

FIG. 7A is pseudocode illustrating execution of process using a nearest right conflict instruction to perform parallel tree reductions of values in registers, according to an embodiment;

FIG. 8A is a block diagram illustrating a generic vector friendly instruction format and class A instruction templates thereof according to embodiments of the invention;

FIG. 8B is a block diagram illustrating the generic vector friendly instruction format and class B instruction templates thereof according to embodiments of the invention;

FIG. 11A is a block diagram illustrating both an exemplary in-order pipeline and an exemplary register renaming, out-of-order issue/execution pipeline according to embodiments of the invention;

FIG. 11B is a block diagram illustrating both an exemplary embodiment of an in-order architecture core and an exemplary register renaming, out-of-order issue/execution architecture core to be included in a processor according to embodiments of the invention;

FIG. 12A is a block diagram of a single processor core, along with its connection to the on-die interconnect network 1002 and with its local subset of the Level 2 (L2) cache 1004, according to embodiments of the invention;

FIG. 12B is an expanded view of part of the processor core in FIG. 12A according to embodiments of the invention;

FIGS. 14-18 are block diagrams of exemplary computer architectures;

FIG. 14 shown a block diagram of a system in accordance with one embodiment of the present invention;

FIG. 15 is a block diagram of a first more specific exemplary system in accordance with an embodiment of the present invention;

FIG. 16 is a block diagram of a second more specific exemplary system in accordance with an embodiment of the present invention;

FIG. 17 is a block diagram of a System-on-a-Chip (SoC) in accordance with an embodiment of the present invention; and FIG. 18 is a block diagram contrasting the use of a software instruction converter to convert binary instructions in a source instruction set to binary instructions in a target instruction set according to embodiments of the invention.

DETAILED DESCRIPTION

Figure 2:
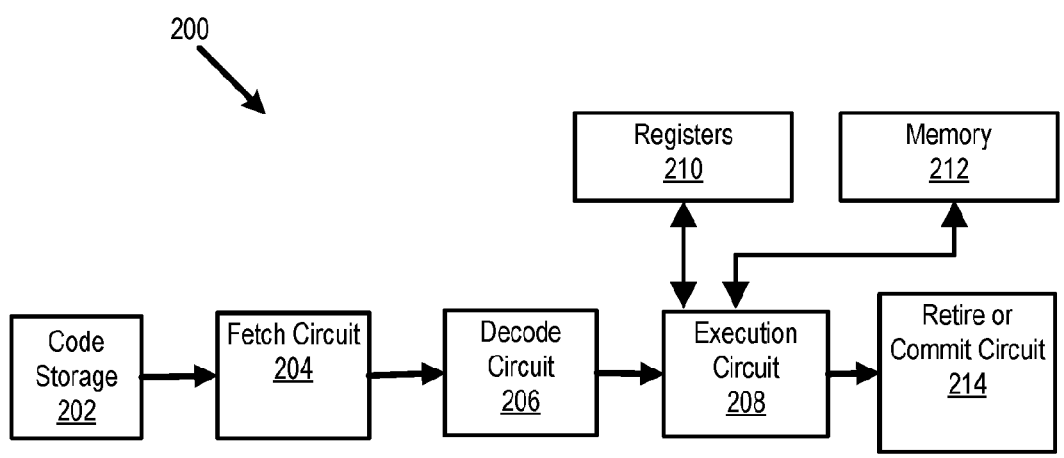
FIG. 2 is a block diagram illustrating processing components for executing a nearest right conflict instruction to detect conflicts within a vector of data values according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

"Sparse updates" are an important algorithmic pattern for which vectorization can be beneficial. To process a sparse update pattern, a read-modify-write operation may be performed on an indirectly addressed memory location (e.g., load A[B[i]], add a computed value to it, and store the value back in A[B[i]]). Vectorizing this type of operation typically involves performing a gather-modify-scatter operation. By way of example, such an operation may involve performing 16 indirect loads of the form A[B[i]] for 16 consecutive values of i via a gather operation, performing a single instruction multiple data (SIMD) computation, and scattering the new values back to memory. However, this vectorization assumes that a single gather/scatter instruction accesses each memory location no more than once. If, for example, two consecutive values of B[i] are the same, then the read-modify-write for the second one is dependent on the first. As such, doing these simultaneously in a SIMD fashion violates these dependencies and can result in an incorrect result.

One technique for vectorizing sparse updates and similar operations involves using a conflict detection instruction, such as the VPCONFLICT instruction, to determine which elements of a vector are duplicates. At a high level, a VPCONFLICT instruction compares the elements within an index vector register (e.g., a register containing index values used to perform indirect updates to a vector of data values) and detects duplicate elements. More specifically, a VPCONFLICT instruction tests each element of its vector register input for equality with all earlier elements of that input (e.g., all elements closer to the least significant bit (LSB)) and outputs the results of these comparisons as a set of bit vectors. In this manner, a VPCONFLICT conflict detection instruction provides a way to determine whether a given vector element has a data dependence involving other elements within the same vector.

FIG. 1 illustrates an exemplary execution of a VPCONFLICT instruction. As shown in FIG. 1, the result of performing the VPCONFLICT instruction on an input vector 101 is an output bit vector 102, where each column of the output bit vector corresponds to a data element position of input vector 101 and indicates other data element positions that store a same value as stored at the data element position and are closer to the LSB. Bit positions of the column closer to the most significant bit (MSB) are filled with zeroes. For example, the column of output bit vector at element position 11 corresponds to the data element position 11 of the input vector 101 and indicates other data element positions (0, 1, 3, 6, and 7) of the input vector 101 that are closer to LSB and store a same data value (9) as stored at the data element position 11. Bit positions of this column starting from 11 and up are filled with zeroes. Similarly, the column of output bit vector 102 at bit position 12 corresponds to the data element position 12 of the input vector 101 and indicates other data element positions (2, 4, and 5) of the input vector 101 that are closer to LSB and store a same data value (5) as that stored at the data element position 12. Bit positions of this column starting from 12 and up are filled with zeroes.

One aspect of the VPCONFLICT instruction is that a full set of comparison results fit in a 512-bit wide vector register only if the size of the index is 32 or 64 bits. If each index is 16 bits wide, then there would be 32 bits of result for each index, but only 16 bits of space available in the register. The situation is even worse for 8 bit indexes. Currently, 16-bit and 8-bit indices are processed by upconverting the indices to 32-bit values thereby losing 2× or 4× efficiency. Further-more, the output of the VPCONFLICT instruction includes redundant information. For example, the ith row of the output bit vector has bits set indicating all matching elements closer to the LSB. As shown in FIG. 1, the column corresponding to output element 6 indicates that it matches elements 3, 1 and 0, but the column corresponding to output element 3 also indicates that it matches elements 1 and 0.

In some embodiments, a new instruction for detecting conflicts in a set of vector elements is disclosed. As described in more detail herein, the execution of the new instruction stores conflict information more efficiently by outputting the position of only the nearest right, i.e. closer to LSB (or, in other embodiments, the nearest left, i.e. closer to MSB) conflicting index position for each vector element, thereby reducing the amount of redundant conflict information generated by the instruction. The conflicting index positions generated by the nearest right conflict detection instruction form a set of linked lists, where the values of a linked list in the set indicate each data element position containing a particular conflicting value. Among other benefits, by storing the conflicting index position information more efficiently, this new instruction can support more standard integer sizes (including byte, word, dword, and qword) than supported by the VPCONFLICT instruction with wider vector registers (fully including 512 and 1024 bit wide registers).

In some embodiments, a method is also disclosed to efficiently perform reduction operations on data element values of an input vector using the conflicting index position information generated by a nearest right conflict instruction. In general, techniques for reducing a set of data elements associated with conflicting index values generally involves the following steps: (1) perform conflict detection on an index vector register and initialize an accumulator register; (2) if no conflicts are detected in the index vector register, jump to step (4); (3) if conflicts are detected, process the values associated with the conflicting index positions inside temporary registers and accumulate values in the accumulator register in an inner loop until all conflicts are processed; and (4) add the accumulator to gathered values from memory and scatter the updated values back to memory. Various implementations exist for performing step (3), including a "base non-tree reduction" algorithm and a tree reduction algorithm.

In some embodiments, an improved method for processing conflicting index positions is referred to herein as a "double permute tree" algorithm. At a high level, this method progresses through the linked lists generated by a nearest right conflict instruction in parallel Instead of advancing one element each Iteration. After each accumulation step, each linked list is rebuilt by removing every other element in the list (e.g., the linked list of conflicting index positions 7->6->3->1->0->-1 becomes 7->3->0->-1) using a permutation operation to permute the permute control vector generated in the previous iteration. Among other benefits, a double permute tree algorithm can be performed using O(log 2(N)) iterations to process N conflicts while also using only a small number of instructions in the innermost loop. This provides a significant instruction reduction advantage, power reduction advantage, and performance advantage over existing methods.

FIG. 2 is a block diagram of a processor to execute a nearest right conflict instruction, according to some embodiments. As shown, computing system 200 includes code storage 202, fetch circuit 204, decode circuit 206, execution circuit 208, registers 210, memory 212, and retire or commit circuit 214. An instruction is fetched by fetch circuit 204 from code storage 202, which may comprise a cache memory, an on-chip memory, a memory on the same die as the processor, an instruction register, a general register, or system memory, without limitation. In one embodiment, the instruction has a format similar to that of instruction 300 in FIG. 3. After fetching the instruction from code storage 202, decode circuit 206 decodes the instruction, including by parsing the various fields of the instruction. After decoding the fetched instruction, execution circuit 208 executes the decoded instruction. When executing the instruction, execution circuit 208 may read data from and write data to registers 210 and memory 212. Registers 210 may include a data register, an instruction register, a vector register, a mask register, a general register, an on-chip memory, a memory on the same die as the processor, or a memory in the same package as the processor, without limitation. Memory 212 may include an on-chip memory, a memory on the same die as the processor, a memory in the same package as the processor, a cache memory, or system memory, without limitation. After the instruction has been executed, retire or commit circuit 214 may retire the instruction, ensuring that execution results are written to or have been written to their destinations, and freeing up or releasing resources for later use.

Figure 3:
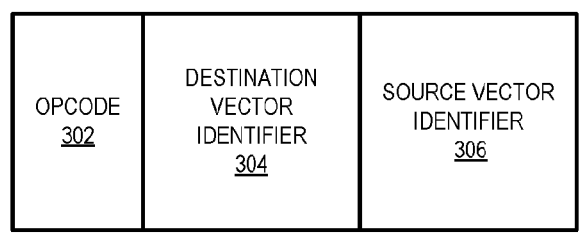
FIG. 3 is a block diagram illustrating a format of a generic nearest right conflict instruction, according to some embodiments.

FIG. 3 is a block diagram illustrating a format of a generic nearest right conflict instruction, according to some embodiments. As shown, instruction 300 includes opcode 302, destination vector identifier 304, and a source vector identifier 306. Destination vector identifier 304 identifies a memory location or a vector register in a register file, to which to write data according to some embodiments. In some embodiments, a source vector identifier 306 identifies a vector register in a register file, wherein the Identified vector register serves as a source vector. In some embodiments, a source vector identifier 306 identifies a memory location as source vector.

Figure 4:
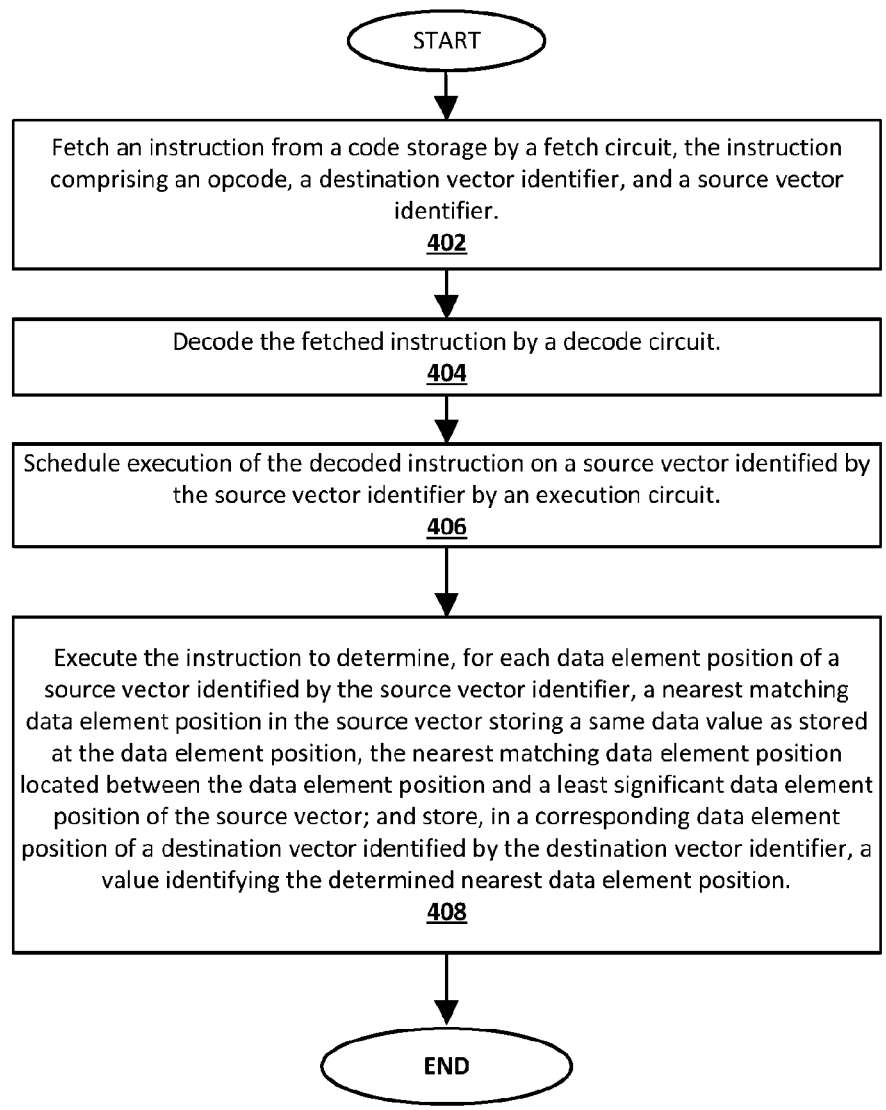
FIG. 4 is a flow diagram of a process to be performed by a processor to execute a nearest right conflict instruction, according to some embodiments.

FIG. 4 is a flow diagram of a process to be performed by a processor to execute a nearest right conflict instruction, according to some embodiments. After starting, the process at 402 fetches an instruction from a code storage by a fetch circuit, the instruction comprising an opcode, a destination vector identifier, and a source vector identifier. At 404, a decode circuit decodes the fetched instruction. At 406, execution of the decoded instruction on a source vector identified by the source vector identifier by an execution circuit is scheduled.

At 408, the execution circuit determines, for each data element position of the source vector, a nearest matching data element in the source vector storing a same data value as stored at the data element position, the nearest matching data element position in the source vector located between the data element position and a least significant data element position of the source vector, and stores a value identifying the determined nearest data element position in a corresponding data element position of a destination vector identified by the destination vector identifier. In some embodiments, the value identifying the determined nearest data element position is a numerical index position or, if there is no such nearest index position, a default value (e.g., −1). The stored values form a set of one or more linked list of values. Referring again to FIG. 1, for example, the output for element 11 is 7 (because element 7 is the nearest right index position storing the same value 9), the output for element 7 is 6, the output for element 6 is 3, and so forth. Thus, these values form a linked list of the form 7->6->3->1->0->−1 indicating the index positions of each vector element having a same value of 9.

FIG. 5A includes pseudocode illustrating an embodiment of a process to be performed by a processor to execute a nearest right conflict instruction, according to some embodiments.

Embodiments of the pseudocode listed in FIG. 5A may be implemented in hardware, software, firmware, or a combination of such implementation approaches. Some embodiments of pseudocode are to be implemented as computer programs or program code executing on programmable systems comprising at least one processor, a storage system (including volatile and non-volatile memory and/or storage elements), at least one input device, and at least one output device.

The pseudocode listed in FIG. 5A may not by itself suffice to perform all aspects of an application or other software. The pseudocode listed in FIG. 5A illustrates relevant aspects of embodiments disclosed herein. Additional software routines to control inputs and outputs and other functionality are known to those of ordinary skill and may be used.

As shown in pseudocode 500 and in the diagram 501 shown in FIG. 5I, execution of a nearest right conflict instruction "VCONF_NRC" determines, for each data element position of a source vector identified by the source vector identifier (e.g., each data element position "src[i]"), a nearest data element position in the source vector storing a same data value as stored at the data element position, the nearest matching data element position located between the data element position and a least significant data element position of the source vector. For example, the loop "for (k=i−1; k>=0; k--)" checks whether any of the data element positions "src[k]" to the right of the current data element position "src[i]" store a same data value as stored at position "src[i]" and exits the loop if a match is found. The pseudocode 500 further illustrates that a value identifying the determined nearest data element position is stored in a corresponding data element position of a destination vector (e.g., "dest[i]=k" or "dest[i]=−1" by default if no match is found).

FIG. 5B includes diagrams illustrating execution of a nearest right (or left) conflict instruction, according to some embodiments. Diagram 501 shows an example execution of nearest right conflict instruction on a source vector 502 having eight data elements. Diagram 501 also shows a destination vector 503 storing values based on performance of the nearest right conflict instruction on the source vector 502. For example, the data element position 7 of the destination vector 503 stores the value 6 to indicate that the nearest right conflict for the value stored at data element position 7 (the value 9) is stored at data element position 6 in the source vector 502. Similarly, the data element position 6 of the destination vector 503 stores the value 3 to indicate that the nearest right conflict for the value stored at data element position 6 is stored at data element position 3. The data element positions 2 and 0 each store the value −1 to indicate that there is no other data element position to the right storing a conflicting value. The destination vector 503 of FIG. 5B thus forms two separate linked lists of data element position values: 6->3->1->0->−1 (indicating each of the data element positions storing the value 9) and 4->2->−1 (indicating each of the data element positions storing the value 5). As shown, the destination vector 503 decreases the amount of information used to represent a set of conflicting data element positions compared to a set of bit vectors generated by the VPCONFLICT instruction.

Diagram 504 shows an example of performing a similar "nearest left" conflict instruction (e.g., VCONF_NLC). Diagram 504 shows a destination vector 506 storing values based on performance of the nearest left conflict instruction on the source vector 505. For example, the data element position 0 of the destination vector 506 stores the values 1 to indicate that the nearest left conflict for the value stored at data element position 0 (the value 9) is stored at data element position 1 in the source vector 505. Similarly, the data element position 2 of the destination vector 506 stores the value 4 to indicate that the nearest left conflict for the value stored at data element position 2 (the value 5) is stored at data element position 4. In this manner, for each data element position of the source vector 505, the corresponding data element position of the destination vector 506 stores a value indicating the nearest matching data element position located between the data element position and a most significant data element position of the source vector 505.

Diagram 507 illustrates an example of performing a nearest right conflict instruction on data stored in big-endian format. For example, whereas the data elements of the source vectors and destination vectors are stored in little-endian format in diagrams 501 and 504, the data elements of source vector 508 and destination vector 509 are stored in big-endian format. Similar to diagrams 501 and 504, either a nearest right conflict or nearest left conflict instruction can be performed on the data in source vector 508 depending on the Implementation.

Figure 6:
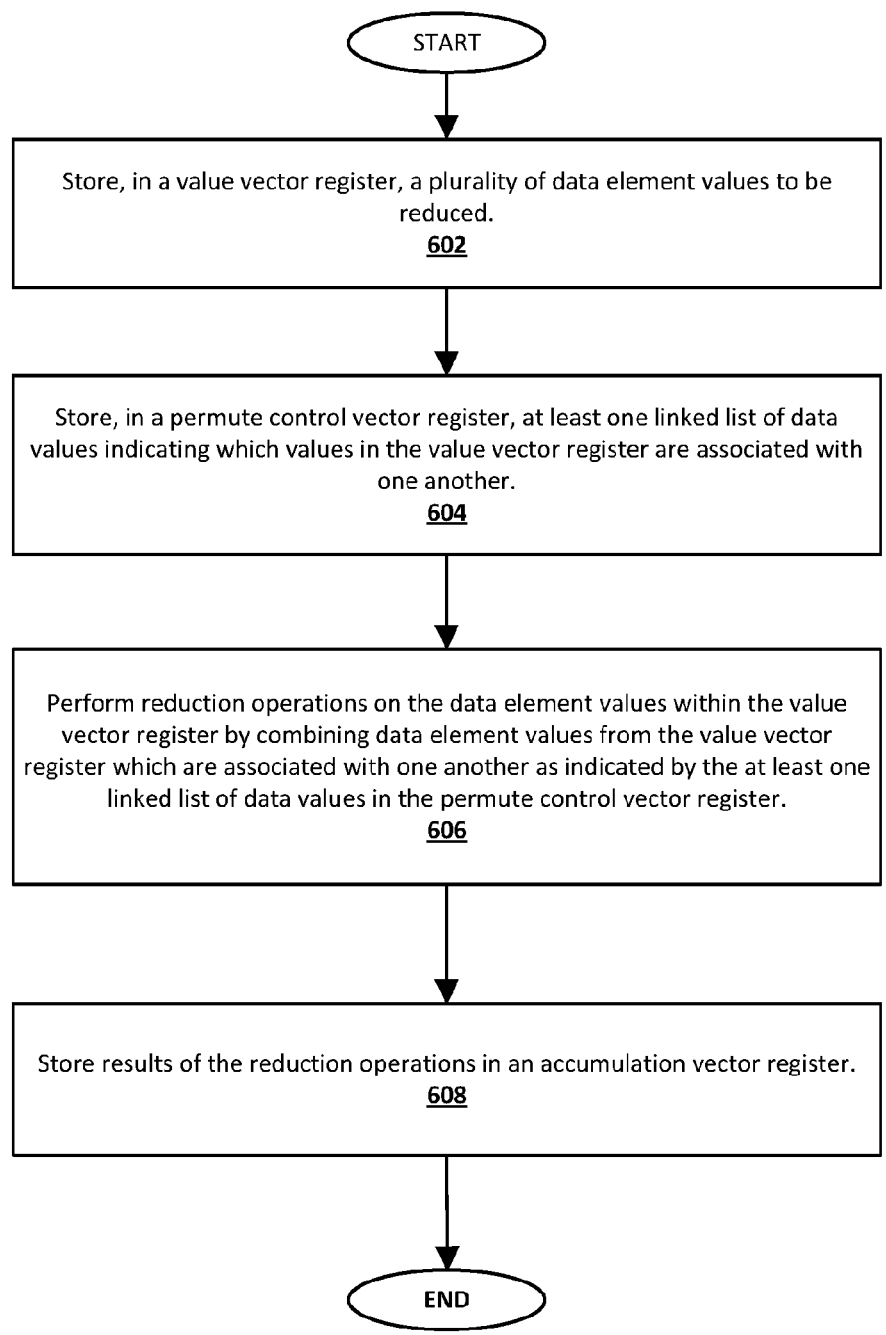
FIG. 6 is a flow diagram of a process for using a nearest right conflict instruction to perform parallel tree reductions of values in registers, according to some embodiments.

FIG. 6 is flow diagram of a process for using a nearest right conflict instruction to perform parallel tree reductions of values in registers, according to an embodiment.

At block 602, a plurality of data element values to be reduced are stored in a value vector register. At block 604, at least one linked list of data values indicating which values in the value vector register are associated with one another is stored in a permute control vector register. For example, a VCONF_NRC instruction can be used to generate the at least one linked list of data values, as described in reference to FIG. 4, where the at least one linked list of data values indicate data elements of an index vector that conflict based on references to a same value of the value vector register.

At block 606, reduction operations are performed on the data element values within the value vector register by combining data element values from the value vector register which are associated with one another as indicated by the at least one linked list of data values in the permute control register. For example, as illustrated in reference to FIGS. 7A-7B, a double permute tree process can be used to perform the reduction operations. In some embodiments, the double permute tree algorithm processes the at least one linked list of data values in parallel instead of advancing one element in each iteration. At each intermediate accumulation step, the at least one linked list of data values is rebuilt by removing every other element in the list by permuting the previous iterations permutation control vector.

At block 608, the results of the reduction operations are stored in an accumulation vector register.

FIG. 7A includes pseudocode illustrating an embodiment of a process performed by a processor to perform parallel tree reductions of values in registers. Embodiments of the pseudocode listed in FIG. 7A may be implemented in hardware, software, firmware, or a combination of such implementation approaches. Some embodiments of pseudocode are to be implemented as computer programs or program code executing on programmable systems comprising at least one processor, a storage system (including volatile and non-volatile memory and/or storage elements), at least one input device, and at least one output device.

It should be understood that the pseudocode 701 listed in FIG. 7A does not by itself suffice to perform all aspects of an application or other software. The pseudocode listed in FIG. 7A illustrates relevant aspects of embodiments disclosed herein. Additional software routines to control inputs and outputs and other functionality are known to those of ordinary skill and may be used.

As shown in FIG. 7A, the pseudocode 701 illustrates that a set of linked lists generated by a nearest right conflict instruction are packed in an output permute control vector ("vperm_control") by the operation "vperm_control=VCONF_NRC(vindex1)." In one embodiment, a permutation operation uses the permute control vector "vperm_control" as a first input (that is, the permutation indexes) and either the vector of sums "vres" or permute control vector "vperm_control" as a second input vector (that is, the values to permute), and the output vector can be either "vtmp" or "vperm_control."

In an embodiment, an accumulation operation performs reduction between the two input vectors "vres" and "vtmp" and stores the output as vector "vres" under write mask "mask_todo", as shown by the operation "vres (mask_todo)=VADD(vtmp, vres)." In other embodiments, the reduction operations can be any of associative arithmetical or logical operations (for example, −=, *=, and so forth). In an embodiment, a detection operation receives a set of linked lists and outputs a control mask where the corresponding bit is zero if the linked list is zero length, otherwise the output is a one. For example, the detection operation can be performed by a comparator, which compares the "vperm_control" elements to the value −1 (where the −1 value indicates a zero-length linked list). The input vector is "vperm_control" and the output is a mask "mask_todo," as shown by the operation "mask_todo=VCMPNEQ (vperm_control, vall_minus_ones)."

In an embodiment, a completion operation determines whether all bits in "mask_todo" are zeroes and, if so, exits the loop. The input for the completion operation is "mask_todo" and the output is a state flag. In an embodiment, when the state flag is set, the results are stored to memory. In one embodiment, the results are stored to memory using a scatter instruction, where the inputs are the vector of indexes and "vres" and the output is a destination in memory determined by the vector of indexes.

Figure 7B:
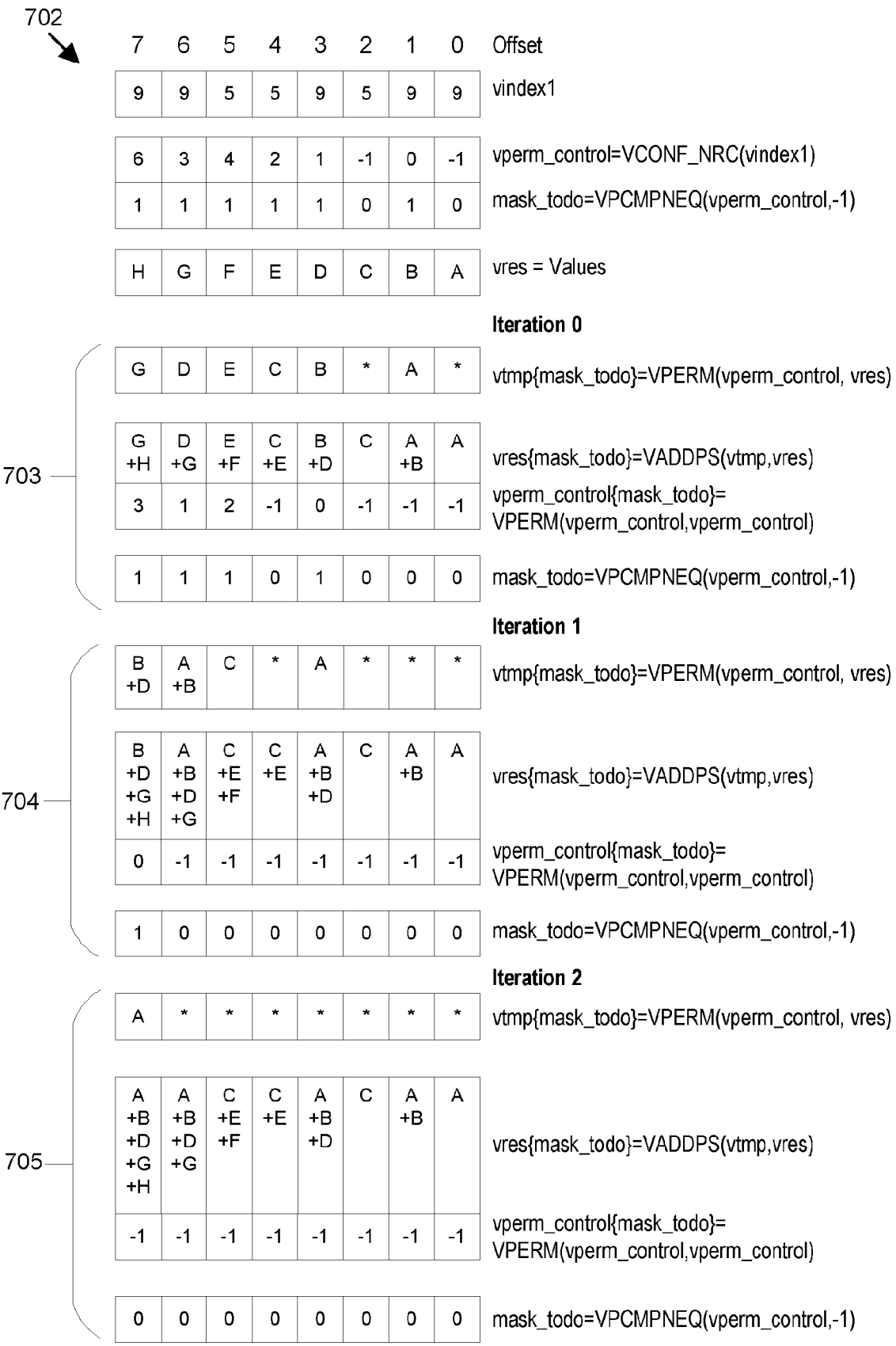
FIG. 7B is a diagram illustrating execution of process using a nearest right conflict instruction to perform parallel tree reductions in values in registers, according to an embodiment.

FIG. 7B is a diagram illustrating an example execution of a double permute tree algorithm. For example, FIG. 7B depicts an input vector of indexes "vindex1" and vector of values to accumulate "vres." The outcome of each iteration of the inner while loop shown in FIG. 7A is shown in iterations 703, 704, and 705. For example, initially the vector "vindex1" stores a set of index values (9, 9, 5, 5, 9, 5, 9, 9). The VCONF_NRC instruction is used to store a set of linked lists (6, 3, 4, 2, 1, −1, 0, −1) in the permute control vector "vperm_control." A "mask_todo" vector is generated using the VPCMPNEQ instruction with the "vperm_control" vector and the value −1 as input (to determine which of the linked lists is of zero length). The "vres" vector is set with the initial values.

At iteration 0, the "vtmp" vector is set with values using a permutation instruction VPERM having input vector "vperm_control" as a vector of permute control indexes and "vres" as vector of values to permute. The VPERM instruction is performed under the mask "mask_todo" such that elements already accumulated (that is, where the corresponding data element position of the permute control vector stores the value −1) are masked out. For example, the data elements of "vtmp" in iteration 0 at positions 0 and 2 store a wildcard * value corresponding to the positions of the "mask_todo" mask storing the value 0. The "vres" vector is set with values generated by performing a reduction using the VADDPS Instruction having input vectors "vtmp" and "vres." A permutation is performed using the VPERM instruction having the permute control vector "vperm_control" as both inputs, that is, as a vector of permute control indexes and as a vector of values to permute. A VPCMPNEQ instruction is used to compare the set of linked lists stored in the "vperm_control" vector and the value −1 to output a 0 where the length of a linked list is 0 or otherwise output a 1.

At iteration 1, the "vtmp" vector is again set with values using a permutation instruction VPERM with the permute control vector "vperm_control" and value vector "vres" as inputs. The VPERM instruction in iteration 1 is again performed under mask "mask_todo" such that elements already accumulated (those at data element positions 0, 1, 2, and 4) are masked out. The "vres" vector is again set with values generated by performing a reduction using the VADDPS instruction having input vectors "vtmp" and "vres." For example, the data element at position 7 of "vtmp" (B+D) is added to the data element at position 7 of "vres" from iteration 0 (G+H). Similarly, the data element at position 6 of "vtmp" (A+B) is added to the data element at position 7 of "vres" from iteration 0 (D+G), and so forth. The permute control vector "vperm_control" is again used as input to the VPERM instruction such that the permute control vector is both a vector of permute control indexes and a vector of values to permute. The VPCMPNEQ instruction is again used to compare the set of linked lists stored in the updated permute control vector "vperm_control" and the value −1 to output a 0 where the length of a linked list is 0 or otherwise output a 1.

At iteration 2, the "vtmp" vector is again set with values using the VPERM instruction under mask "mask_todo" with inputs permute control vector "vperm_control" and vres. As shown, the data elements of "vtmp" in iteration 2 at positions 0, 1, 2, 3, 4, 5, and 6 store a wildcard * value corresponding to positions of the "mask_todo" mask storing the value 0. The "vres" vector is again set with values using the VADDPS instruction with inputs "vtmp" and vres. For example, the data element position 7 of "vtmp" (A) is added to the data element at position 7 of "vres" from iteration 1 (B+D+G+H). The values at data element positions 0-6 of "vres" remain the same since those elements are fully accumulated as indicated by the mask "mask_todo." The permute control vector "vperm_control" is again used as input to the VPERM Instruction such that "vperm_control" is both a vector of permute control indexes and a vector of values to permute. As shown, the permute control vector now stores the value −1 at each data element position indicating that each of the linked lists initially stored in "vperm_control" has been fully traversed.

As shown in iteration 2, the "vres" vector stores partial sums for each of the conflicting index values of vindex 1. For example, the data element position 0 stores the value "A", the data element position 1 stores the value "A+B", the data element position 3 stores the value "A+B+D", the data element position 6 stores the value "A+B+D+G", and the data element position 7 stores the value "A+B+D+G+H", each representing a partial sum of the corresponding data element values. In an embodiment, a scatter instruction can be used to store the result "vres" vector values to memory.

Instruction Sets

An instruction set may include one or more instruction formats. A given instruction format may define various fields (e.g., number of bits, location of bits) to specify, among other things, the operation to be performed (e.g., opcode)

and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
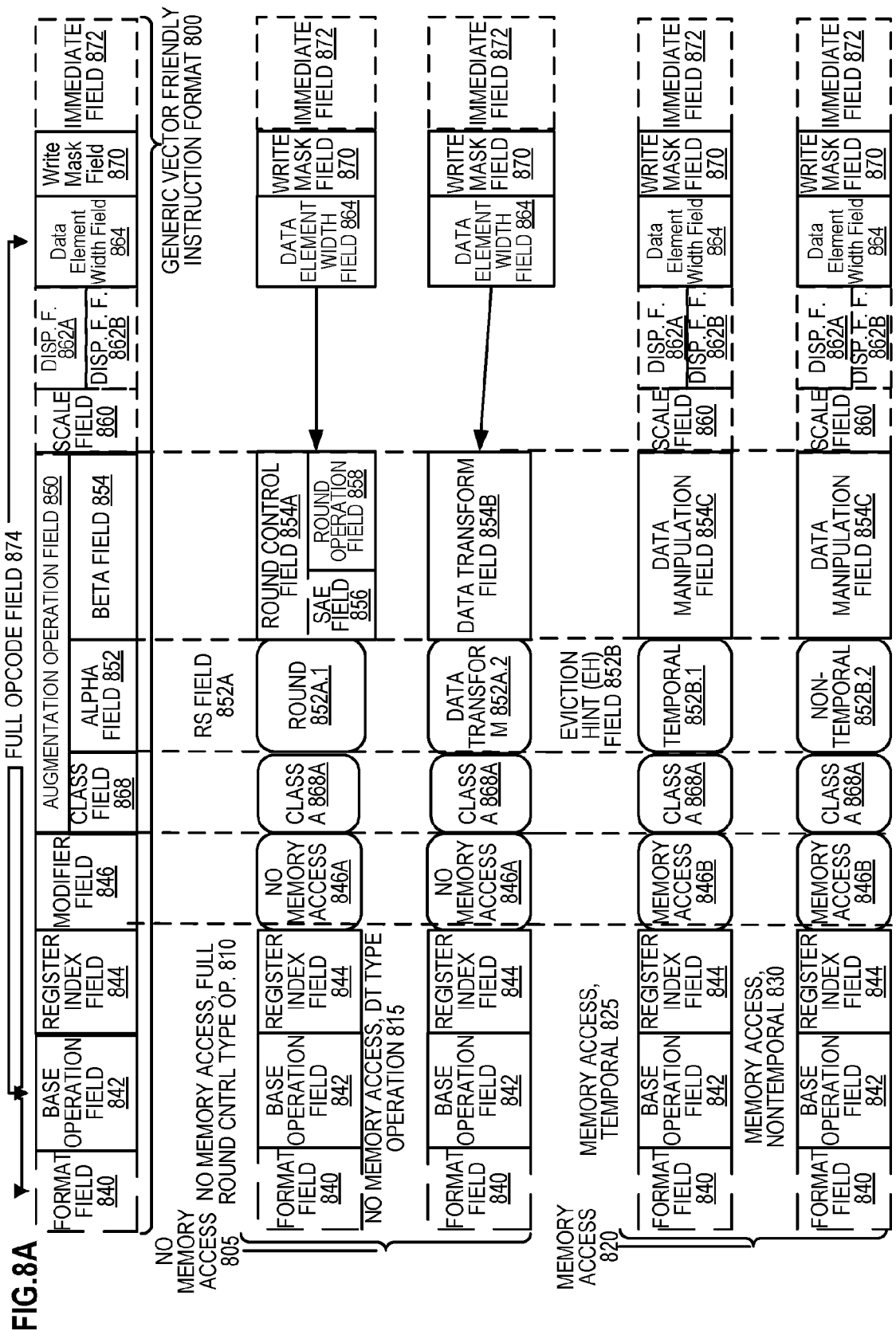
FIGS. 8A-8B are block diagrams illustrating a generic vector friendly instruction format and instruction templates thereof according to embodiments of the invention.
Figure 8B:
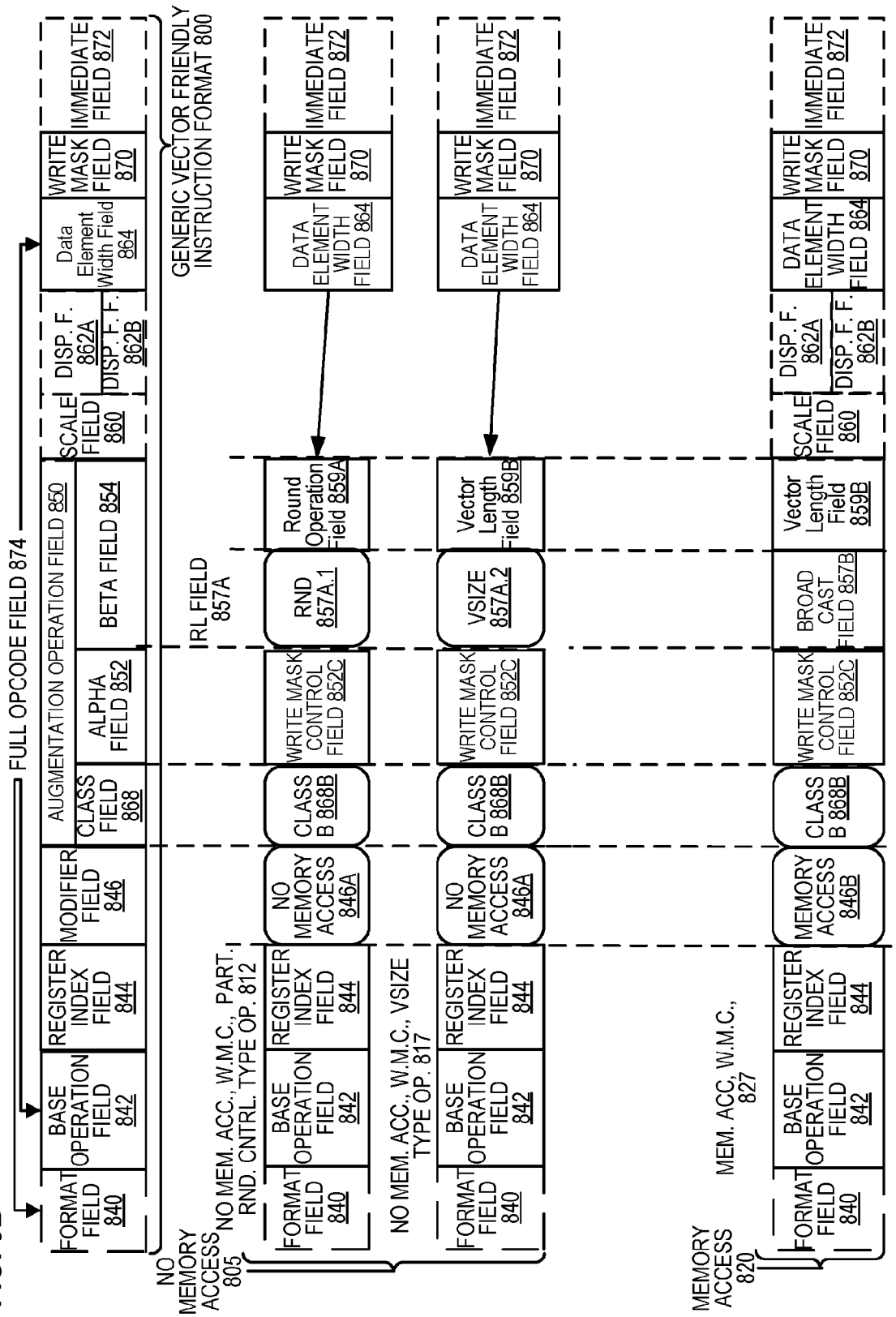

FIGS. 8A-8B are block diagrams illustrating a generic vector friendly instruction format and instruction templates thereof according to embodiments of the invention. FIG. 8A is a block diagram illustrating a generic vector friendly instruction format and class A instruction templates thereof according to embodiments of the invention; while FIG. 8B is a block diagram illustrating the generic vector friendly instruction format and class B instruction templates thereof according to embodiments of the invention. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A-8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination identifiers using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In one embodiment of the invention, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}$*index+base).

Displacement Field 862A—its content is used as part of memory address generation (e.g., for address generation that uses $2^{scale}$*index+base+displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-write masking, while class B instruction templates support both merging- and zeroing-write masking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the invention are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-8B, the contents of this field select between class A and class B instructions. In FIGS. 8A-8B, rounded corner squares are used to indicate a specific value is present in a field (e.g., class A 868A and class B 868B for the class field 868 respectively in FIGS. 8A-88).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale field 862B are not present.

No-Memory Access Instruction Templates—Full Round Control Type Operation

In the no memory access, full round control type operation 810 instruction template, the beta field 854 is interpreted as a round control field 854A, whose content(s) provide static rounding. While in the described embodiments of the invention the round control field 854A includes a suppress all floating point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates, suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one embodiment of the invention where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale field 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A-just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one embodiment of the invention where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

Figure 9A:
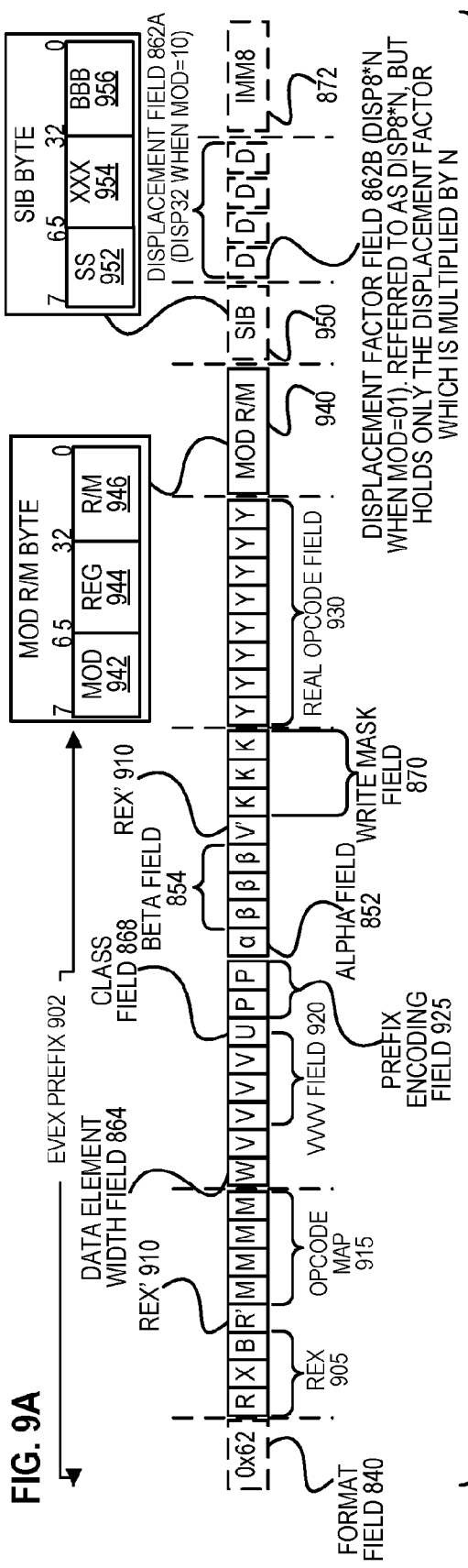
FIG. 9A is a block diagram illustrating an exemplary specific vector friendly instruction format according to embodiments of the invention.

FIG. 9A is a block diagram illustrating an exemplary specific vector friendly instruction format according to embodiments of the invention. FIG. 9A shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9A map are illustrated.

It should be understood that, although embodiments of the invention are described with reference to the specific vector friendly instruction format 900 in the context of the generic vector friendly instruction format 800 for illustrative purposes, the invention is not limited to the specific vector friendly Instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the invention is not so limited (that is, the generic vector friendly instruction format 800 contemplates other sizes of the data element width field 864).

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector friendly instruction format in one embodiment of the invention).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]—R), EVEX.X bit field (EVEX byte 1, bit [6]—X), and 657BEX byte 1, bit [5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 00006. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 910—this is the first part of the REX' field 910 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 In the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]—mmmm)—its content encodes an implied leading opcode byte (OF, OF 38, or OF 3).

Data element width field 864 (EVEX byte 2, bit [7]—W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source vectors; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1 s complement) form. Depending on the instruction, an extra different EVEX bit field is used to extend the specifier size to 32 registers.

EVEX.U 868 Class field (EVEX byte 2, bit [2]—U)—if EVEX.U=0, it indicates class A or EVEX.U0; if EVEX.U=1, it indicates class B or EVEX.U1.

Prefix encoding field 925 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]—EH; also, known as EVEX.EH, EVEX.rs, EVEX.RL, EVEX.write mask control, and EVEX.N; also, illustrated with α)—as previously described, this field is context specific.

Beta field 854 (EVEX byte 3, bits [6:4]—SSS, also known as EVEX.$s_{2-0}$, EVEX.$r_{2-0}$, EVEX.rr1, EVEX.LL0, EVEX.LLB; also, illustrated with βββ)—as previously described, this field is context specific.

REX' field 910—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte (Byte 6)—As previously described, the scale field's 950 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes' offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement assumes that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the Mod RM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Reid

Figure 9B:
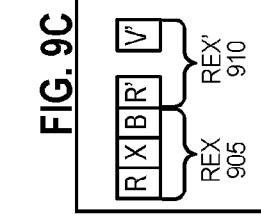
FIG. 9B is a block diagram illustrating the fields of the specific vector friendly instruction format 700 that make up the full opcode field 674 according to one embodiment of the invention.

FIG. 9B is a block diagram illustrating the fields of the specific vector friendly instruction format 900 that make up the full opcode field 874 according to one embodiment of the invention. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

Figure 9C:
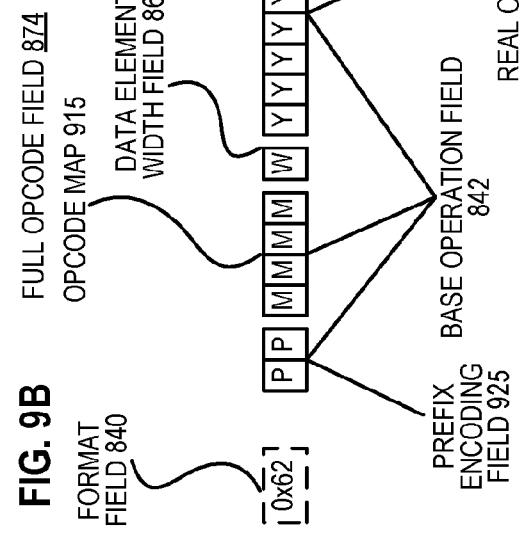
FIG. 9C is a block diagram illustrating the fields of the specific vector friendly instruction format 700 that make up the register index field 644 according to one embodiment of the invention.

FIG. 9C is a block diagram illustrating the fields of the specific vector friendly instruction format 700 that make up the register index field 844 according to one embodiment of the invention. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
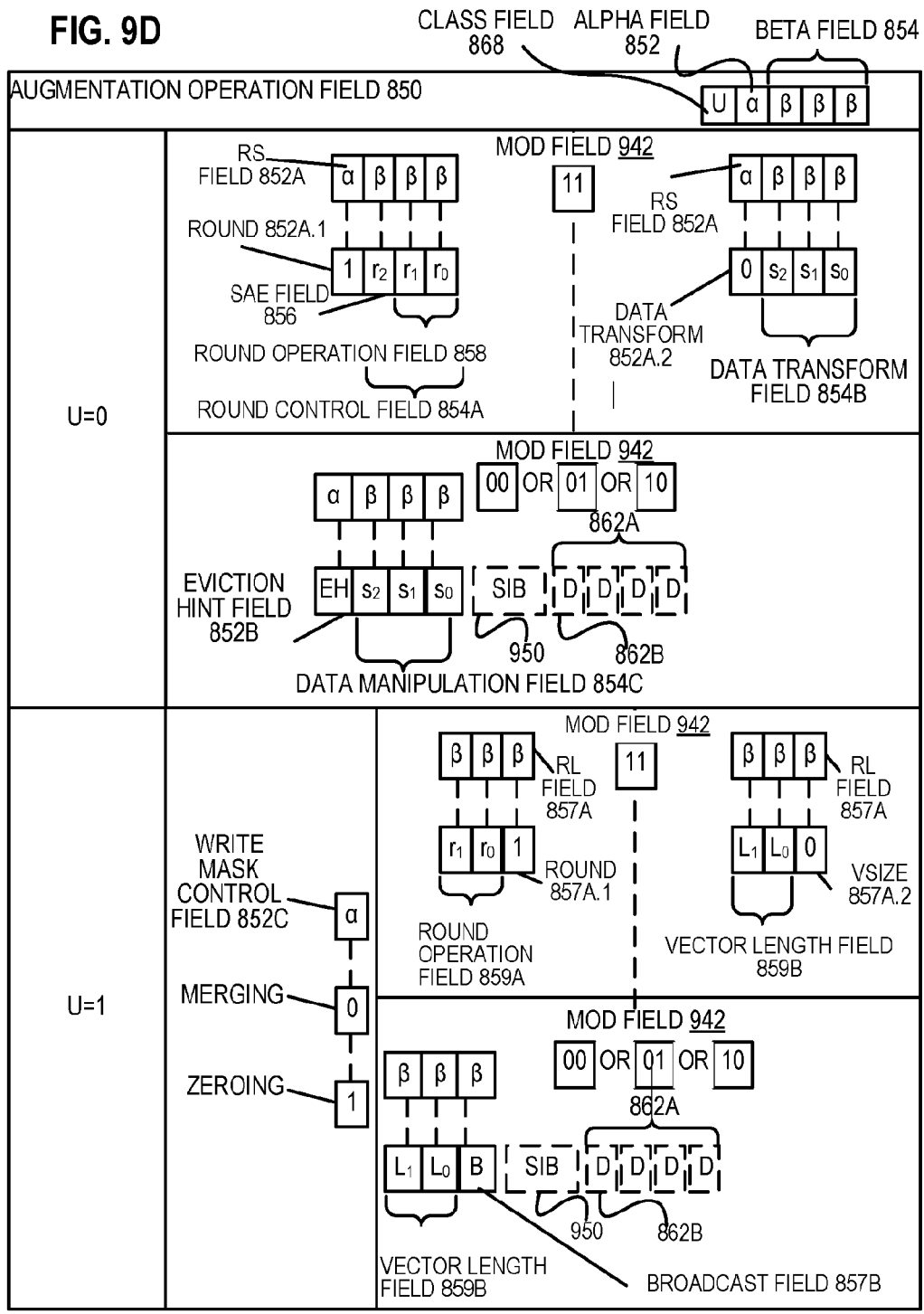
FIG. 9D is a block diagram illustrating the fields of the specific vector friendly instruction format 700 that make up the augmentation operation field 650 according to one embodiment of the invention.

FIG. 9D is a block diagram Illustrating the fields of the specific vector friendly instruction format 900 that make up the augmentation operation field 850 according to one embodiment of the invention. When the class (U) field 868 contains 0, it signifies EVEX.U0 (class A 868A); when it contains 1, it signifies EVEX.U1 (class B 8688). When U=0 and the MOD field 942 contains 11 (signifying a no memory access operation), the alpha field 852 (EVEX byte 3, bit [7]—EH) is interpreted as the rs field 852A. When the rs field 852A contains a 1 (round 852A.1), the beta field 854 (EVEX byte 3, bits [6:4]—SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]—SSS) is interpreted as a three bit data transform field 8548. When U=0 and the MOD field 942 contains 00, 01, or 10 (signifying a memory access operation), the alpha field 852 (EVEX byte 3, bit [7]—EH) is interpreted as the eviction hint (EH) field 852B and the beta field 854 (EVEX byte 3, bits [6:4]—SSS) is interpreted as a three bit data manipulation field 854C.

When U=1, the alpha field 852 (EVEX byte 3, bit [7]—EH) is interpreted as the write mask control (Z) field 852C. When U=1 and the MOD field 942 contains 11 (signifying a no memory access operation), part of the beta field 854 (EVEX byte 3, bit [4]—$S_0$) is interpreted as the RL field 857A; when it contains a 1 (round 857A.1) the rest of the beta field 854 (EVEX byte 3, bit [6-5]—$S_{2-1}$) is interpreted as the round operation field 859A, while when the RL field 857A contains a 0 (VSIZE 857.A2) the rest of the beta field 854 (EVEX byte 3, bit [6-5]—$S_{2-1}$) is interpreted as the vector length field 859B (EVEX byte 3, bit [6-5]—$L_{1-0}$). When U=1 and the MOD field 942 contains 00, 01, or 10 (signifying a memory access operation), the beta field 854 (EVEX byte 3, bits [6:4]—SSS) is interpreted as the vector length field 859B (EVEX byte 3, bit [6-5]—$L_{1-0}$) and the broadcast field 857B (EVEX byte 3, bit [4]—B).

Exemplary Register Architecture

Figure 10:
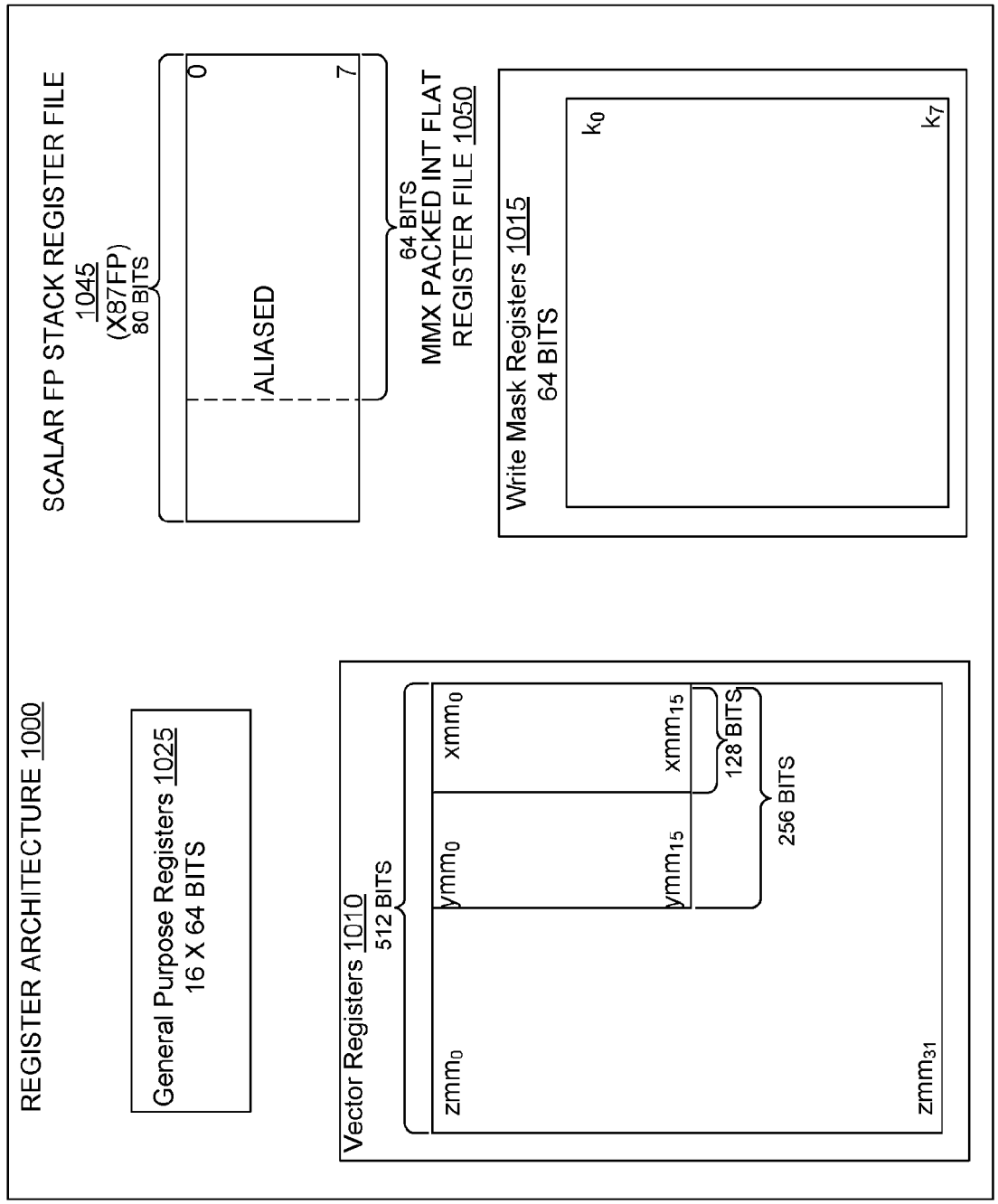
FIG. 10 is a block diagram of a register architecture 1000 according to one embodiment of the invention.

FIG. 10 is a block diagram of a register architecture 1000 according to one embodiment of the invention. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
|---|---|---|---|
| Instruction Templates that do not include the vector length field 1059B | A (FIG. 8A; U = 0) | 810, 815, 825, 830 | zmm registers (the vector length is 64 byte) |
| | B (FIG. 8B; U = 1) | 812 | zmm registers (the vector length is 64 byte) |

-continued

| Adjustable Vector Length | Class | Operations | Registers |
|---|---|---|---|
| Instruction templates that do include the vector length field 659B | B (FIG. 8B; U = 1) | 817, 827 | zmm, ymm, or xmm registers (the vector length is 64 bytes, 32 bytes, or 16 bytes) depending on the vector length field 859B |

In other words, the vector length field selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 Instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-11B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster- and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch unit 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12B:
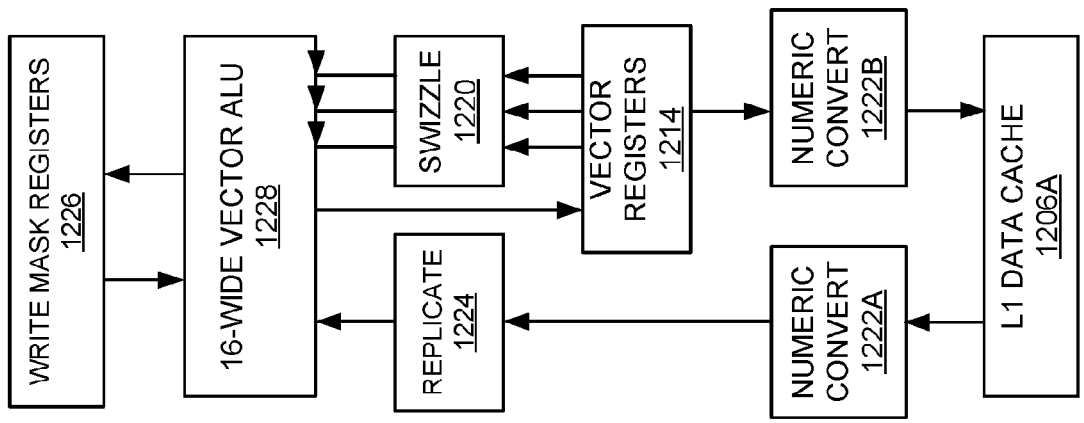
FIGS. 12A-12B illustrate a block diagram of a more specific exemplary in-order core architecture, which core would be one of several logic blocks (including other cores of the same type and/or different types) in a chip.
Figure 12A:
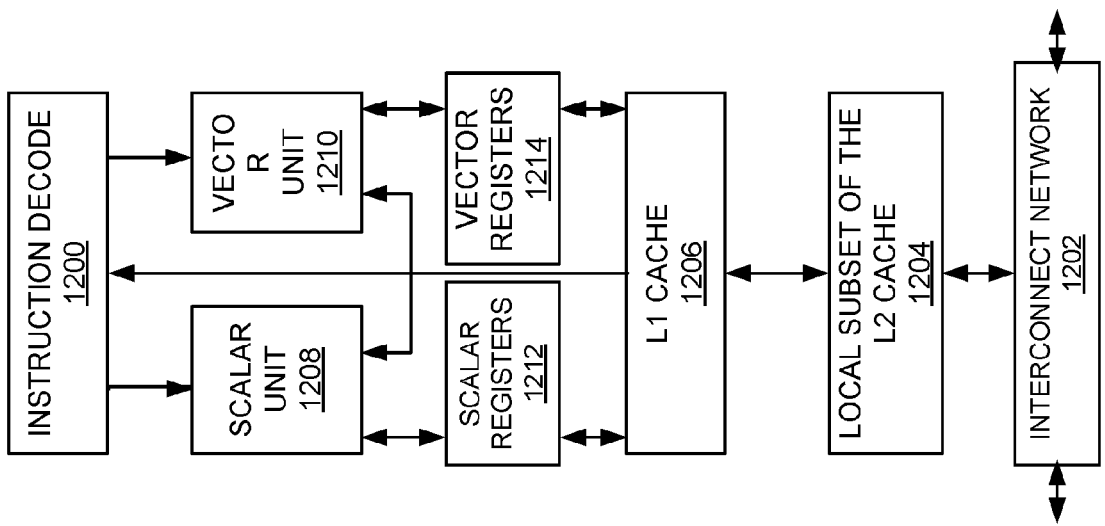

FIGS. 12A-12B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the invention. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
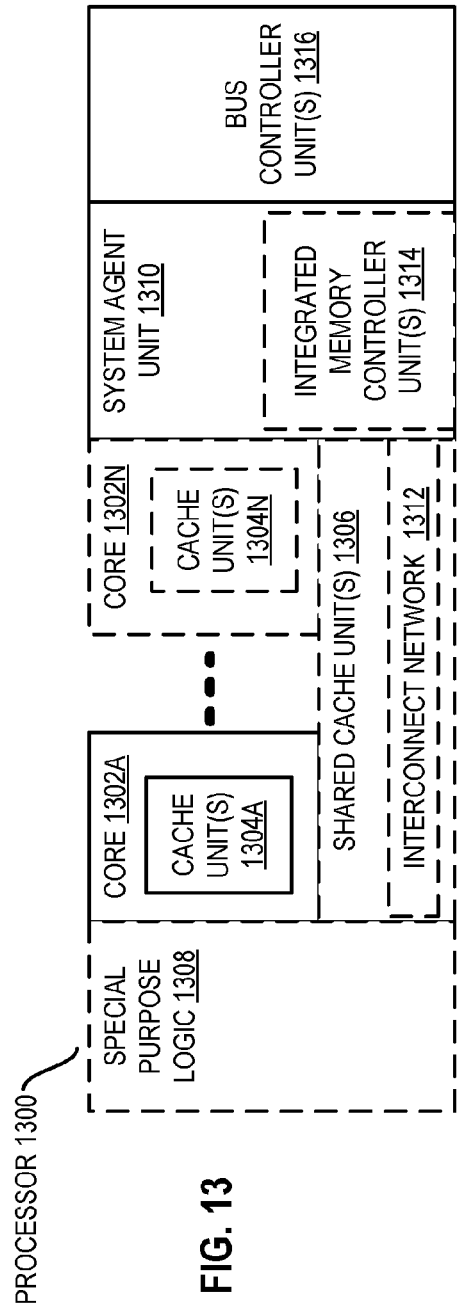
FIG. 13 is a block diagram of a processor 1300 that may have more than one core, may have an integrated memory controller, and may have integrated graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308 (integrated graphics logic 1308 is an example of and is also referred to herein as special purpose logic), the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multithreading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
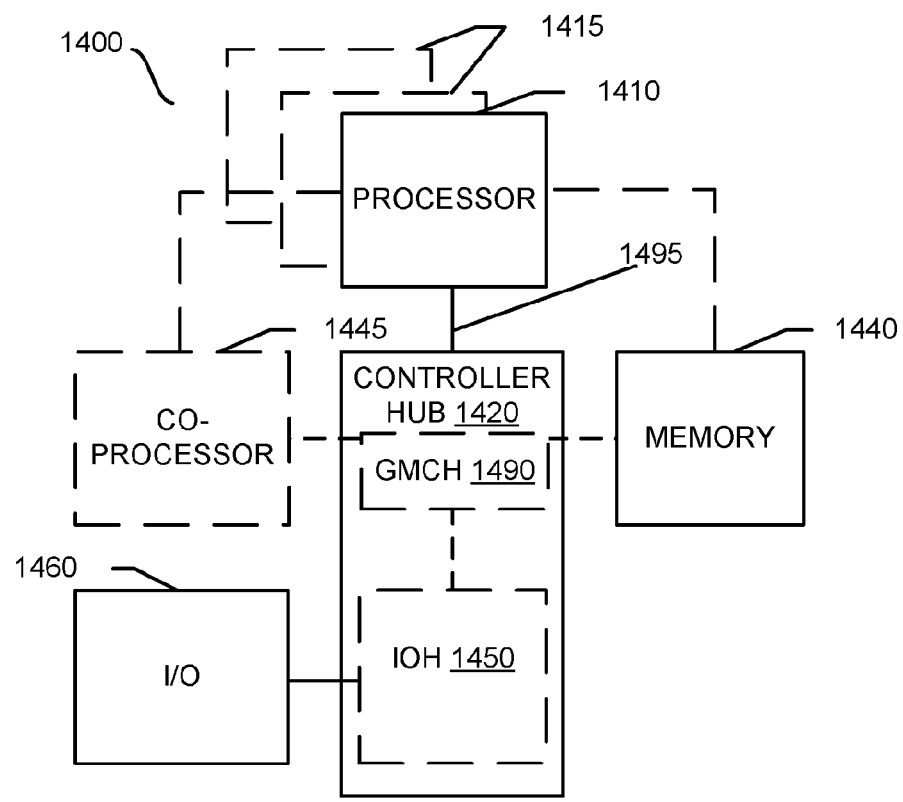

Referring now to FIG. 14, shown is a block diagram of a system 1400 in accordance with one embodiment of the present invention. The system 1400 may include one or more processors 1410, 1415, which are coupled to a controller hub 1420. In one embodiment, the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
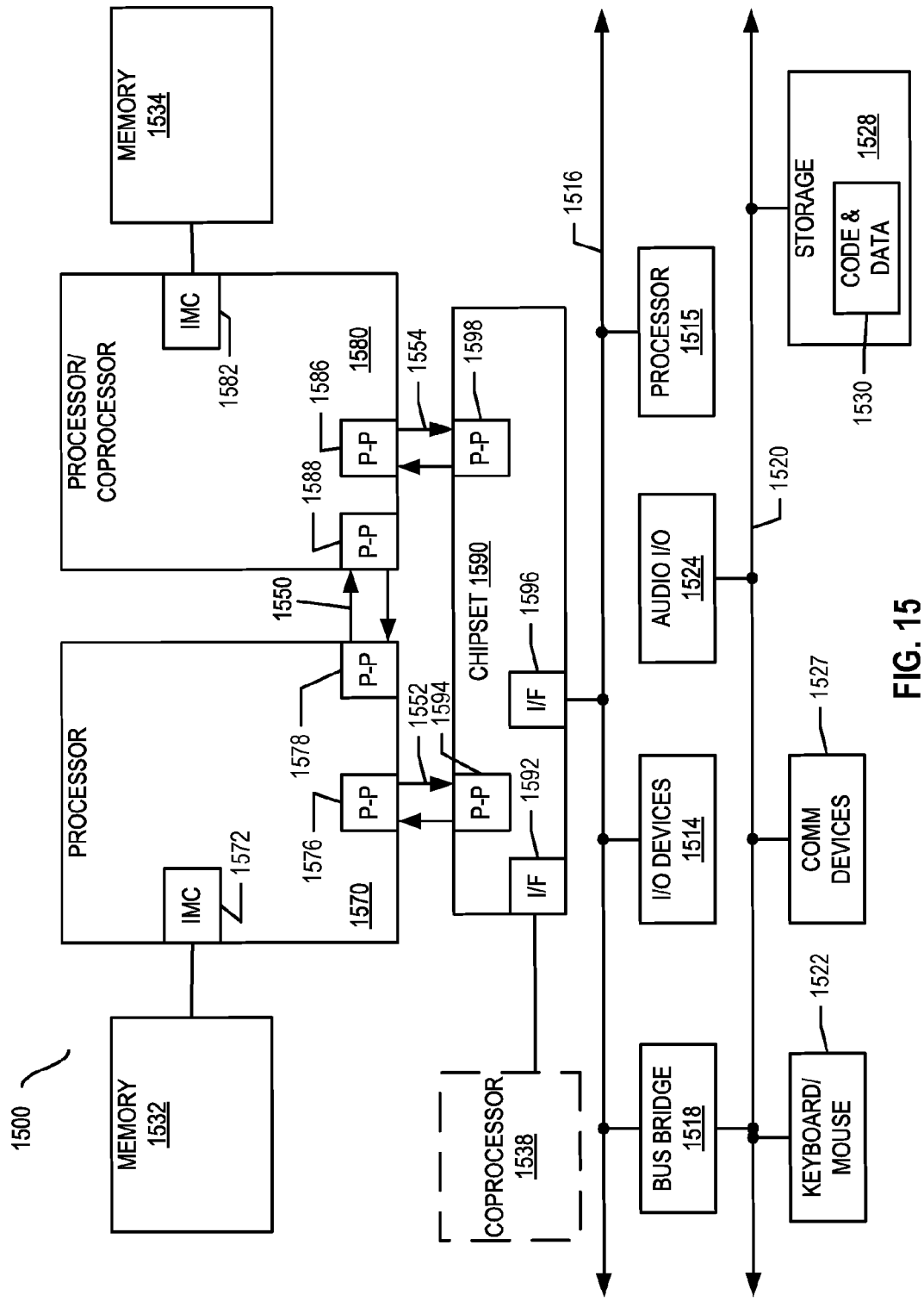

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) Interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1592. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, Instead of the point-to-point architecture of FIG. 15, a system may implement a multi-drop bus or other such architecture.

Figure 16:
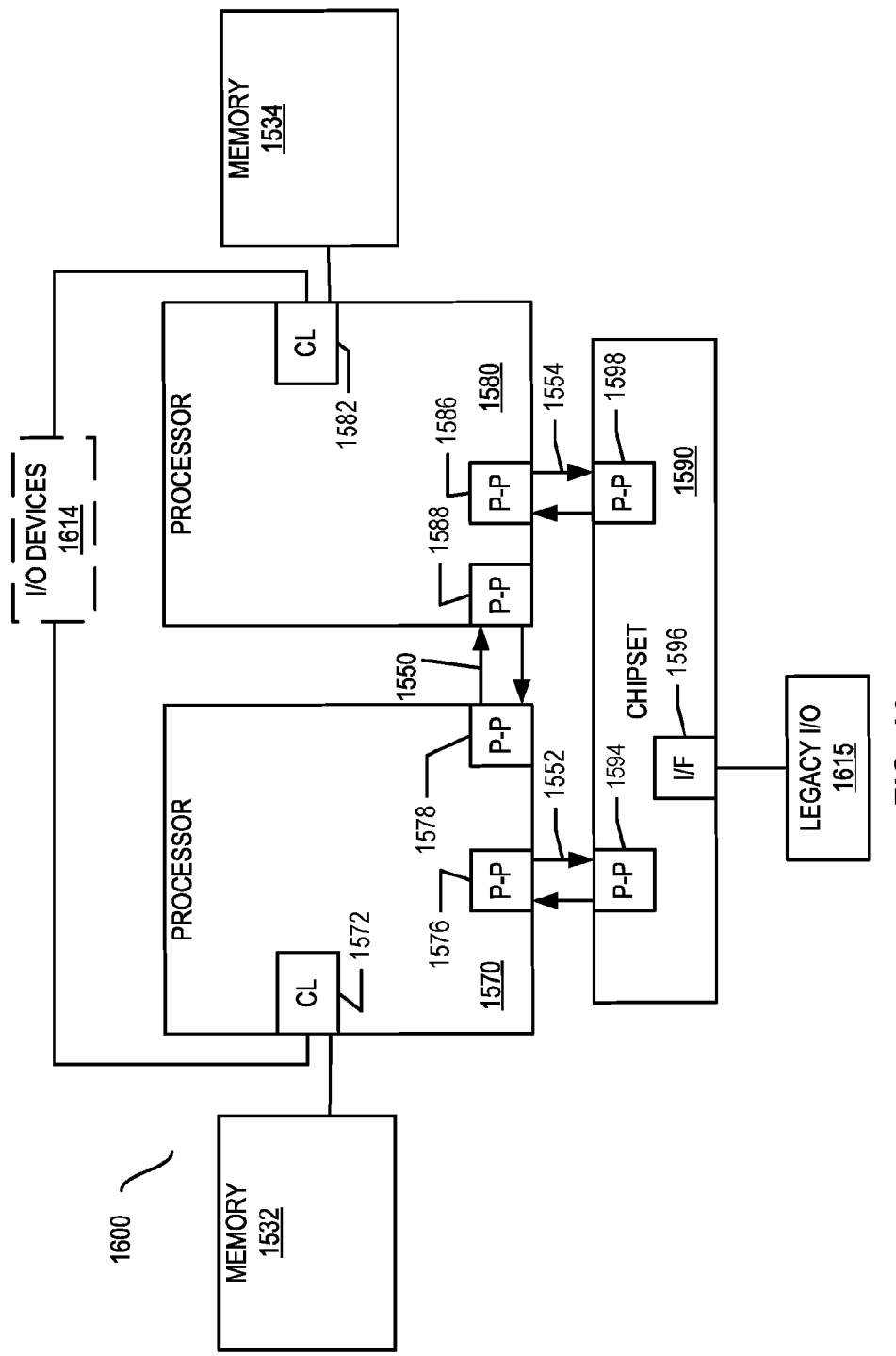

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 14 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
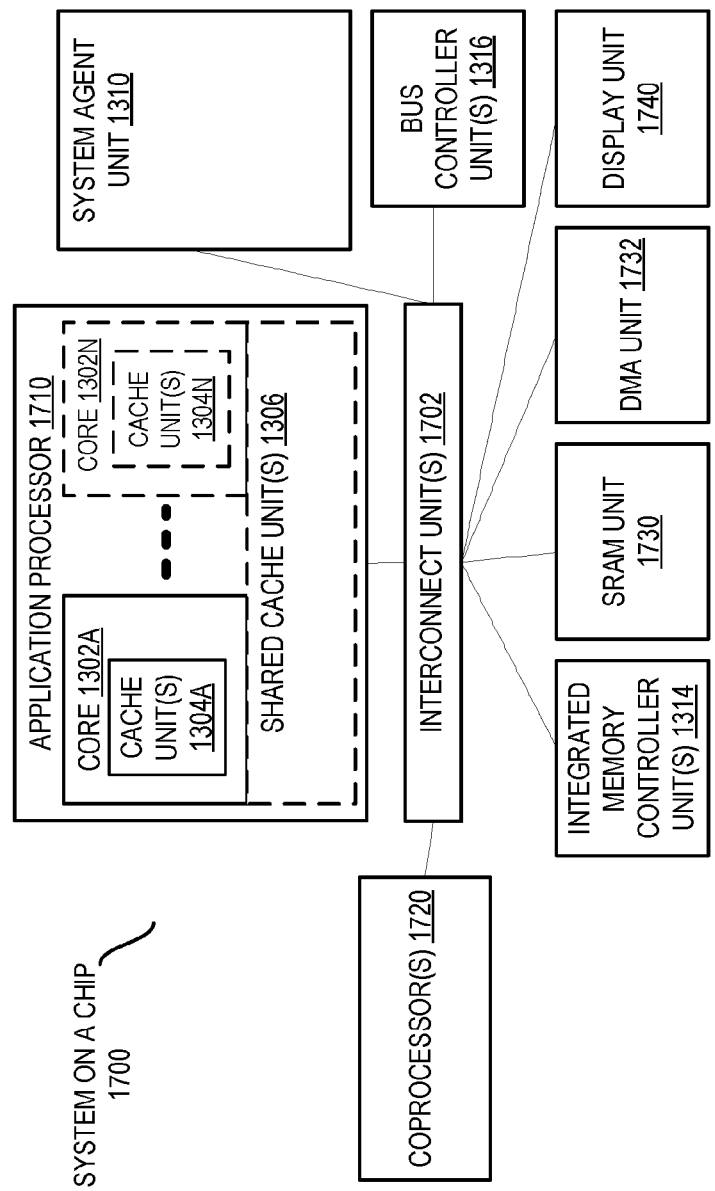

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-N, which include cache units 1304A-N, and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source Instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM Instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

Further Examples

Example 1 provides a method of executing an instruction, the method comprising: decoding an instruction by a decode circuit, the instruction comprising an opcode, a destination vector identifier, and a source vector identifier; and executing the decoded instruction by an execution circuit on a source vector identified by the source vector identifier by: for each data element position of the source vector: determining a nearest matching data element position in the source vector storing a same data value as stored at the data element position, the nearest matching data element position located between the data element position and a least significant data element position of the source vector; and storing, in a corresponding data element position of a destination vector identified by the destination vector identifier, a value identifying the determined nearest data element position.

Example 2 includes the substance of the exemplary method of Example 1, wherein the value identifying the determined nearest data element position is a default value if none of the data element positions stores a same data value as the value stored at the data element position.

Example 3 includes the substance of the exemplary method of Example 1, wherein the destination vector identifier and the source vector identifier identify storage locations.

Example 4 includes the substance of the exemplary method of Example 1, wherein a size of data elements in the source vector identified by the source vector identifier is one of byte, word, doubleword, and quadword.

Example 5 includes the substance of the exemplary method of Example 1, wherein the values stored in the destination vector represent a set of one or more linked lists of data values.

Example 6 provides a system for executing an instruction, the system comprising: a decode circuit to decode an instruction, the instruction comprising an opcode, a destination vector identifier, and a source vector identifier; and an execution circuit to execute the decoded instruction to, for each data element position of a source vector identified by the source vector identifier: determine a nearest matching data element position in the source vector storing a same data value as stored at the data element position, the nearest matching data element position located between the data element position and a least significant data element position of the source vector, and store, in a corresponding data element position of a destination vector identified by the destination vector identifier, a value identifying the determined nearest data element position.

Example 7 includes the substance of the exemplary system of Example 6, wherein the value identifying the determined nearest data element position is a default value if none of the data element positions stores a same data value as the value stored at the data element position.

Example 8 includes the substance of the exemplary method of Example 6, wherein the destination vector identifier and the source vector identifier identify storage locations.

Example 9 includes the substance of the exemplary method of Example 6, wherein a size of data elements in the source vector identified by the source vector identifier is one of byte, word, doubleword, and quadword.

Example 10 includes the substance of the exemplary method of Example 6, wherein the values stored in the destination vector represent a set of one or more linked lists of data values.

Example 11 provides a processor for executing an instruction, the processor comprising: a decode circuit to decode an instruction, the instruction comprising an opcode, a destination vector identifier, and a source vector identifier; and an execution circuit to execute the decoded instruction to, for each data element position of a source vector identified by the source vector identifier: determine a nearest matching data element position in the source vector storing a same data value as stored at the data element position, the nearest matching data element position located between the data element position and a least significant data element position of the source vector, and store, in a corresponding data element position of a destination vector identified by the destination vector identifier, a value identifying the determined nearest data element position.

Example 12 includes the substance of the exemplary processor of Example 11, wherein the value identifying the determined nearest data element position is a default value if none of the data element positions stores a same data value as the value stored at the data element position.

Example 13 includes the substance of the exemplary processor of Example 11, wherein the destination vector identifier and the source vector identifier identify storage locations.

Example 14 includes the substance of the exemplary processor of Example 11, wherein a size of data elements in the source vector identified by the source vector identifier is one of byte, word, doubleword, and quadword.

Example 15 includes the substance of the exemplary processor of Example 11, wherein the values stored in the destination vector represent a set of one or more linked lists of data values.

Example 16 provides an apparatus for executing an instruction, the apparatus comprising: means for decoding an instruction, the instruction comprising an opcode, a destination vector identifier, and a source vector identifier; and means for executing the decoded instruction to, for each data element position of a source vector identified by the source vector identifier: determine a nearest matching data element position in the source vector storing a same data value as stored at the data element position, the nearest matching data element position located between the data element position and a least significant data element position of the source vector, and store, in a corresponding data element position of a destination vector identified by the destination vector identifier, a value identifying the determined nearest data element position.

Example 17 includes the substance of the exemplary apparatus of Example 16, wherein the value identifying the determined nearest data element position is a default value if none of the data element positions stores a same data value as the value stored at the data element position.

Example 18 includes the substance of the exemplary apparatus of Example 16, wherein the destination vector identifier and the source vector identifier identify storage locations.

Example 19 includes the substance of the exemplary apparatus of Example 16, wherein a size of data elements in the source vector identified by the source vector identifier is one of byte, word, doubleword, and quadword.

Example 20 includes the substance of the exemplary apparatus of Example 16, wherein the values stored in the destination vector represent a set of one or more linked lists of data values.

Example 21 provides a non-transitory computer readable medium containing instructions that, when performed by a processor, cause performance of operations comprising: decoding an instruction by a decode circuit, the instruction comprising an opcode, a destination vector identifier, and a source vector identifier; and executing the decoded instruction by an execution circuit on a source vector identified by the source vector identifier to, for each data element position of the source vector: determine a nearest matching data element position in the source vector storing a same data value as stored at the data element position, the nearest matching data element position located between the data element position and a least significant data element position of the source vector, and store, in a corresponding data element position of a destination vector identified by the destination vector identifier, a value identifying the determined nearest data element position.

Example 22 includes the substance of exemplary non-transitory computer-readable medium of Example 21, wherein the value identifying the determined nearest data element position is a default value if none of the data element positions stores a same data value as the value stored at the data element position.

Example 23 includes the substance of exemplary non-transitory computer-readable medium of Example 21, wherein the destination vector identifier and the source vector identifier identify storage locations.

Example 24 includes the substance of exemplary non-transitory computer-readable medium of Example 21, wherein a size of data elements in the source vector identified by the source vector identifier is one of byte, word, doubleword, and quadword.

Example 25 includes the substance of exemplary non-transitory computer-readable medium of Example 21, wherein the values stored in the destination vector represent a set of one or more linked lists of data values.

Example 26 provides a method, comprising: storing, in a value vector register, a plurality of data element values to be reduced; storing, in a permute control vector register corresponding to an index vector register, at least one linked list of data values indicating which values in the value vector register are associated with one another; performing reduction operations on the data element values within the value vector register by combining data element values from the value vector register which are associated with one another as indicated by the at least one linked list of data values in the permute control vector register; and storing results of the reduction operations in an accumulation vector register.

Example 27 includes the substance of the exemplary method of Example 26, wherein performing the reduction operations includes determining groups of data element values which have the same index value and combining the data elements having the same index value to generate a plurality of results, each result of the plurality of results comprising an arithmetic combination of a group of data element values sharing the same index value.

Example 28 includes the substance of the exemplary method of Example 26, wherein each result is stored within a specified data element location of the accumulation vector register.

Example 29 includes the substance of the exemplary method of Example 26, wherein performing the reduction operations includes performing a plurality of combination iterations on element values sharing the same index value, each of the combination iterations combining pairs of data element values until a final result is reached in a final iteration.

Example 30 provides a non-transitory computer readable medium containing instructions that, when performed by a processor, cause performance of operations comprising: storing, in a value vector register, a plurality of data element values to be reduced; storing, in a permute control vector register corresponding to an index vector register, at least one linked list of data values indicating which values in the value vector register are associated with one another; performing reduction operations on the data element values within the value vector register by combining data element values from the value vector register which are associated with one another as indicated by the at least one linked list of data values in the permute control vector register; and storing results of the reduction operations in an accumulation vector register.

Example 31 includes the substance of exemplary non-transitory computer-readable medium of Example 30, wherein performing the reduction operations includes determining groups of data element values which have the same index value and combining the data elements having the same index value to generate a plurality of results, each result of the plurality of results comprising an arithmetic combination of a group of data element values sharing the same index value.

Example 32 includes the substance of exemplary non-transitory computer-readable medium of Example 30, wherein each result is stored within a specified data element location of the accumulation vector register.

Example 33 includes the substance of exemplary non-transitory computer-readable medium of Example 30, wherein performing the reduction operations includes performing a plurality of combination iterations on element values sharing the same index value, each of the combination iterations combining pairs of data element values until a final result is reached in a final iteration.

What is claimed is:

1. A method for executing an instruction, the method comprising:
   decoding an instruction by a decode circuit, the instruction comprising an opcode, a destination vector identifier, and a source vector identifier; and
   executing the decoded instruction by an execution circuit on a source vector identified by the source vector identifier by:
   for each data element position of the source vector:
      determining a nearest matching data element position in the source vector storing a same data value as stored at the data element position, the nearest matching data element position located between the data element position and a least significant data element position of the source vector; and
      storing, in a corresponding data element position of a destination vector identified by the destination vector identifier, a value identifying the determined nearest data element position.

2. The method of claim 1, wherein the value identifying the determined nearest data element position is a default value if none of the data element positions stores a same data value as the value stored at the data element position.

3. The method of claim 1, wherein the destination vector identifier and the source vector identifier identify storage locations.

4. The method of claim 1, wherein a size of data elements in the source vector identified by the source vector identifier is one of byte, word, doubleword, and quadword.

5. The method of claim 1, wherein the values stored in the destination vector represent a set of one or more linked lists of data values.

6. A processor for executing an instruction, the processor comprising:
   a decode circuit to decode an instruction, the instruction comprising an opcode, a destination vector identifier, and a source vector identifier; and
   an execution circuit to execute the decoded instruction to, for each data element position of a source vector identified by the source vector identifier:
      determine a nearest matching data element position in the source vector storing a same data value as stored at the data element position, the nearest matching data element position located between the data element position and a least significant data element position of the source vector, and
      store, in a corresponding data element position of a destination vector identified by the destination vector identifier, a value identifying the determined nearest data element position.

7. The processor of claim 6, wherein the value identifying the determined nearest data element position is a default value if none of the data element positions stores a same data value as the value stored at the data element position.

8. The processor of claim 6, wherein the destination vector identifier and the source vector identifier identify storage locations.

9. The processor of claim 6, wherein a size of data elements in the source vector identified by the source vector identifier is one of byte, word, doubleword, and quadword.

10. The processor of claim 6, wherein the values stored in the destination vector represent a set of one or more linked lists of data values.

11. A non-transitory machine-readable medium containing instructions that, when performed by a processor, cause performance of operations comprising:
    decoding an instruction by a decode circuit, the instruction comprising an opcode, a destination vector identifier, and a source vector identifier; and
    executing the decoded instruction by an execution circuit on a source vector identified by the source vector identifier to, for each data element position of the source vector:
        determine a nearest matching data element position in the source vector storing a same data value as stored at the data element position, the nearest matching data element position located between the data element position and a least significant data element position of the source vector, and
        store, in a corresponding data element position of a destination vector identified by the destination vector identifier, a value identifying the determined nearest data element position.

12. The non-transitory machine-readable medium of claim 11, wherein the value identifying the determined nearest data element position is a default value if none of the data element positions stores a same data value as the value stored at the data element position.

13. The non-transitory machine-readable medium of claim 11, wherein the destination vector identifier and the source vector identifier identify storage locations.

14. The non-transitory machine-readable medium of claim 11, wherein a size of data elements in the source vector identified by the source vector identifier is one of byte, word, doubleword, and quadword.

15. The non-transitory machine-readable medium of claim 11, wherein the values stored in the destination vector represent a set of one or more linked lists of data values.

* * * * *